(12) United States Patent
Kidd et al.

(10) Patent No.: US 8,239,220 B2
(45) Date of Patent: Aug. 7, 2012

(54) METHOD AND APPARATUS FOR OBTAINING PHOTOGRAMMETRIC DATA TO ESTIMATE IMPACT SEVERITY

(75) Inventors: Scott D. Kidd, San Antonio, TX (US); Darrin A. Smith, San Antonio, TX (US)

(73) Assignee: Injury Sciences LLC, San Antonio, TX (US)

( * ) Notice: Subject to any disclaimer, the term of this patent is extended or adjusted under 35 U.S.C. 154(b) by 1029 days.

(21) Appl. No.: 11/519,560

(22) Filed: Sep. 12, 2006

(65) Prior Publication Data
US 2007/0288135 A1 Dec. 13, 2007

Related U.S. Application Data

(60) Provisional application No. 60/811,964, filed on Jun. 8, 2006.

(51) Int. Cl.
*G01M 17/00* (2006.01)
*G06F 19/00* (2011.01)
(52) U.S. Cl. ............................... 705/4; 705/1
(58) Field of Classification Search .............. 701/29, 701/301, 35; 382/276–308; 705/1, 4
See application file for complete search history.

(56) References Cited

U.S. PATENT DOCUMENTS

| | | | | |
|---|---|---|---|---|
| 4,794,262 A | * | 12/1988 | Sato et al. | 250/559.22 |
| 4,839,823 A | | 6/1989 | Matsumoto | 706/52 |
| 5,128,859 A | | 7/1992 | Carbone et al. | 364/401 |
| 5,317,503 A | * | 5/1994 | Inoue | 700/90 |
| 5,760,415 A | * | 6/1998 | Hauck et al. | 250/559.33 |
| 6,381,561 B1 | | 4/2002 | Bomar, Jr. et al. | 703/8 |
| 6,470,303 B2 | * | 10/2002 | Kidd et al. | 703/8 |
| 6,711,495 B1 | | 3/2004 | Ukai et al. | 701/207 |
| 6,885,981 B2 | | 4/2005 | Bomar, Jr. et al. | 703/8 |
| 6,950,013 B2 | | 9/2005 | Scaman et al. | 340/436 |

(Continued)

FOREIGN PATENT DOCUMENTS

EP 1 338 883 A1 8/2003

(Continued)

OTHER PUBLICATIONS

PCT/US2007/13214 Internatidnal Search Report with Written Opinion of the International Searching Authority Mailed Sep. 19, 2008.

(Continued)

*Primary Examiner* — John Nguyen
*Assistant Examiner* — Kyung Kim
(74) *Attorney, Agent, or Firm* — Trop, Pruner & Hu, P.C.

(57) ABSTRACT

In one embodiment, the present invention includes a computer-implemented method to collect information to determine damage to a vehicle involved in a collision using photogrammetric techniques. When determined, this vehicle damage information, which may be in the form of crush measurement information such as a crush damage profile, can be displayed in a computer-generated view of the subject vehicle with a crush damage profile and used to estimate the impact severity. In some embodiments, based on the photogrammetric information derived, a direction of any shifting of the vehicle's components may be obtained and used along with other information to estimate a principal direction of force (PDOF) for one or more vehicles involved in the collision. Still further embodiments may be used to generate and/ or audit repair estimates based at least in part on the photogrammetric information.

10 Claims, 18 Drawing Sheets

U.S. PATENT DOCUMENTS

| | | | | |
|---|---|---|---|---|
| 6,975,919 | B2 | 12/2005 | Kluft | 700/177 |
| 7,197,444 | B2 | 3/2007 | Bomar, Jr. et al. | 703/8 |
| 7,239,945 | B2 | 7/2007 | Hiemer et al. | 701/29 |
| 7,359,821 | B1 | 4/2008 | Smith et al. | 702/113 |
| 7,376,492 | B2 | 5/2008 | Srack et al. | |
| 2001/0033685 | A1* | 10/2001 | Ishiyama | 382/154 |
| 2002/0013685 | A1* | 1/2002 | Kidd et al. | 703/8 |
| 2002/0055861 | A1 | 5/2002 | King et al. | |
| 2002/0099527 | A1* | 7/2002 | Bomar et al. | 703/8 |
| 2003/0014224 | A1* | 1/2003 | Guo et al. | 703/1 |
| 2003/0200123 | A1* | 10/2003 | Burge et al. | 705/4 |
| 2004/0148188 | A1 | 7/2004 | Uegaki | 705/1 |
| 2004/0243368 | A1 | 12/2004 | Hiemer et al. | 703/8 |
| 2004/0243423 | A1* | 12/2004 | Rix et al. | 705/1 |
| 2005/0125127 | A1* | 6/2005 | Bomar et al. | 701/45 |
| 2005/0182518 | A1* | 8/2005 | Karlsson | 700/253 |
| 2007/0061155 | A1* | 3/2007 | Ji et al. | 705/1 |
| 2007/0081695 | A1* | 4/2007 | Foxlin et al. | 382/103 |
| 2007/0203866 | A1* | 8/2007 | Kidd et al. | 706/47 |
| 2009/0002364 | A1* | 1/2009 | Witte, II | 345/419 |
| 2009/0290787 | A1* | 11/2009 | Stevens et al. | 382/154 |

FOREIGN PATENT DOCUMENTS

| | | |
|---|---|---|
| WO | WO03040867 | 5/2003 |
| WO | WO 2005/041071 A1 | 5/2005 |

OTHER PUBLICATIONS

European Patent Office, International Search Report And Written Opinion For International Application. No. PCT/US07/13215, 8 pages, Jan. 31, 2008.

U.S. Patent and Trademark Office, Office Action Mailed Nov. 15, 2007 for U.S. Appl. No. 11/363,421, 17 Pages Total.

PCT/US2007/013215 International Search Report with Written Opinion of the International Searching Authority Mailed Sep. 14, 2009.

U.S. Patent and Trademark Office, International Search Report And Written Opinion For International Application. No. PCT/US07/04410, 7 pages, Feb. 26, 2008.

U.S. Appl. No. 12/069,603, filed Feb. 12, 2008, entitled "Methods And Apparatus For Using Black Box Data To Analyze Vehicular Accidents," by Darrin A. Smith and Scott Palmer.

U.S. Appl. No. 11/511,823, filed Aug. 29, 2006, entitled "Method And Apparatus For Obtaining And Using Event Data Recorder Triage Data," by Scott D. Kidd and Darrin A. Smith.

U.S. Appl. No. 11/363,421, filed Feb. 27, 2006, entitled "Method And Apparatus For Obtaining And Using Impact Severity Triage Data," by Scott D. Kidd and Darrin A. Smith.

U.S. Appl. No. 10/166,866, filed Jun. 11, 2002, entitled "Methods And Apparatus For Using Black Box Data To Analyze Vehicular Accidents," by Darrin A. Smith and Scott Palmer.

European Patent Office, Communication Pursuant to Article 94(3) EPC dated Dec. 28, 2009 in European patent application No. 07809319.2-1236/2030139.

State Intellectual Property Office, P.R. China, First Office Action dated Apr. 13, 2010, in Chinese patent application No. 2007800212253.

Australian Government, IP Australia, Examiner's Report issued on Apr. 16, 2010, in Australian patent application No. 2007258684.

Canadian Intellectual Property Office, Office Action mailed Jan. 28, 2011 in Canadian patent application No. 2,653,385.

Canadian Intellectual Property Office, Office Action mailed Sep. 2, 2011 in Canadian application No. 2,653,385.

State Intellectual Property Office, P.R. China, Second Office Action issued Jul. 6, 2011 in Chinese application No. 200780021225.3.

* cited by examiner (a)           (b)           (c)

METHOD AND APPARATUS FOR OBTAINING PHOTOGRAMMETRIC DATA TO ESTIMATE IMPACT SEVERITY

This application claims priority to U.S. Provisional Patent Application No. 60/811,964 filed on Jun. 8, 2006 in the name of Scott D. Kidd and Darrin A. Smith entitled METHOD AND APPARATUS FOR OBTAINING PHOTOGRAMMETRIC DATA TO ESTIMATE IMPACT SEVERITY.

BACKGROUND

Embodiments of the present invention relate to vehicular accident analysis and specifically to the collection and analysis of information for using the principles of photogrammetry to estimate vehicle damage and impact severity.

Organizations such as insurance companies and others are tasked with investigating accidents to resolve property and injury claims. Part of the investigation is to determine the severity and direction of the impact. A review of repair estimates and photos is usually done to develop a qualitative assessment of impact severity. If there is damage beyond the bumper of the vehicle(s) (i.e., there is crush damage to the vehicle), the vehicle is often given the qualitative assessment of a significant impact based on a subjective review of the damage information. As much as 40% of accidents of a low severity are subjectively analyzed as a high severity impact, primarily because of the damage to the vehicle(s).

One solution to determining crush damage is to measure the crush when the vehicle is examined for damage and use that information to determine impact severity. The measurement of crush requires some training to understand the concepts and insure consistency, and is also time consuming. With high turnover in the insurance industry and a desire to improve operational efficiency, this creates an ongoing and potentially expensive effort.

Alternately, organizations can retain forensic experts such as engineers and accident reconstructionists to evaluate accident information, reconstruct the accident scenario and characteristics including the determination of the magnitude and direction of the impact. This is an expensive and non-timely solution to be used on wide-scale basis.

The current solution for determining the components and operations required to fix a damaged vehicle is to visually inspect the vehicle. A list of components is created identifying which should be repaired or replaced. This visual inspection process frequently requires a second or more inspection to correct errors in the first inspection. This is a labor intensive and inefficient process. The current process does not leverage the information from similar impacts to similar vehicles.

The Principal Direction of Force (PDOF) is the main axis along which the force of the impact acts on the vehicle. The PDOF is a factor in both the determining of injury potential of the accident and determining which components of the vehicle are damaged. The current method of determining PDOF is to examine photos, descriptions of the accident and possibly scene information to determine the final resting locations of the vehicles. In low to moderate severity impacts, the final resting locations of the vehicles are either not particularly relevant or not available. The current evaluation of PDOF is done by forensic experts which is an expensive and time consuming process.

SUMMARY

In one aspect, the present invention includes a computer-implemented method to collect information to determine vehicle damage by photogrammetry. A computer system is used to send pictures and camera settings from one computer to another computer to determine vehicle crush damage via photogrammetric techniques. Cameras used to take pictures for use in the program may be identified and their characteristics stored in a central location for use when photos taken by the camera are sent to the central location. The camera and pictures can be selected for transfer from one computer to another computer via computer network, wireless transmission, and the like.

In another aspect, a computer-generated selection of vehicle poses is presented via computer. The selection of the pose determines the angle at which the photo was taken and sets the frame of reference. The pose can also be determined by placing optical markers on the vehicle at the time the photos are taken. The optical markers can help detect points on the vehicle such as the tires, and can thus aid in determining the pose automatically via the computer analysis of the photos.

Still in another aspect, a computer-generated selection of control points is presented via computer. Standard points on the vehicle that were not damaged in the subject accident are marked in each of the photos of the subject vehicle. These standard points may allow for comparison between different poses of the vehicle to allow triangulation of the points between the different photos. The control points can also be determined by placing optical markers on the vehicle at the time the photos are taken. The optical markers can help detect points on the vehicle such as the windshield, and refine the pose automatically via computer analysis of the photos.

In another aspect, a computer-generated grid of vehicle damage points is presented and selected for the subject vehicle. The damage points allow for comparison between different poses of the vehicle to allow the triangulation of the points between the different photos. The damage points can also be determined by placing optical markers on the vehicle at the time the photos are taken. The optical markers can help to detect points on the vehicle such as the head lights or tail lights, and can thus aid in determining the damage automatically via the computer analysis of the photos.

In another aspect, a computer-generated crush damage profile may be calculated for the subject vehicle using photogrammetic techniques and comparing the points of the damaged vehicle generated by photogrammetry to an undamaged vehicle. The results may be displayed in a computer-generated view of the subject vehicle with a crush damage profile and used to estimate the impact severity.

In another aspect, a computer-implemented method of determining the direction of shifting of the vehicle's components may be provided. This information can be combined with information about pre-accident actions and questions regarding the pre-accident vehicle speeds via computer to estimate the Principal Direction of Force (PDOF) for the vehicles involved in the collision.

In another aspect, the depth of damage and direction of impact to the vehicle can be compared with similar vehicles of similar depth of damage and direction of impact with respect to the components required to repair the vehicle. The comparison can be used to generate a list of components that may need to be repaired or replaced to restore the vehicle. The comparison can alternatively be used to audit repair estimates that were developed independently, in some implementations.

DETAILED DESCRIPTION

Photos of vehicles damaged in a collision can be taken to determine the extent of damage. These photos then can be used to estimate the amount of deformation to the vehicle and determine the impact severity for the vehicle. Impact severity can be used to determine the possible injury potential for the accident or to determine what components should be repaired or replaced to repair the vehicle.

Photogrammetry is a measurement technology in which the three-dimensional coordinates of points on an object are determined by measurements made in two or more photographic images taken from different positions. Embodiments of the present invention use a photogrammetric system for measuring vehicular crush from photographs. This system can be broken down into four steps: (1) camera calibration; (2) camera pose estimation; (3) triangulation; and (4) bundle adjustment.

Camera calibration is the process for identifying an individual camera's geometric and optical characteristics, so that metric information can be obtained from its images. A camera's characteristics can be divided into two categories—extrinsic parameters and intrinsic parameters. Extrinsic parameters refer to the spatial relationship between the camera and the object of interest. Intrinsic parameters refer to the camera's optical characteristics.

The process of determining a camera's position and aiming direction (or orientation) from known XYZ coordinates of the object is called resection. In computer vision literature, this is also known as the exterior orientation problem or camera pose estimation problem. The known XYZ coordinates of the object are called control points.

Photogrammetry uses a principle called triangulation to determine an object's three-dimensional coordinates from multiple photographs. Points are triangulated by finding the intersection of converging lines of sight, or rays. By taking photographs of the object from at least two different locations and measuring the same target in each photograph, lines of sight are defined from each camera position to the target. If the camera positions and orientations are known, then these rays can be intersected to find the 3D coordinate in object space.

Bundle adjustment is the process of refining a visual reconstruction to produce jointly optimal structure (3D feature points of an object) and motion (camera pose).

Figure 1:
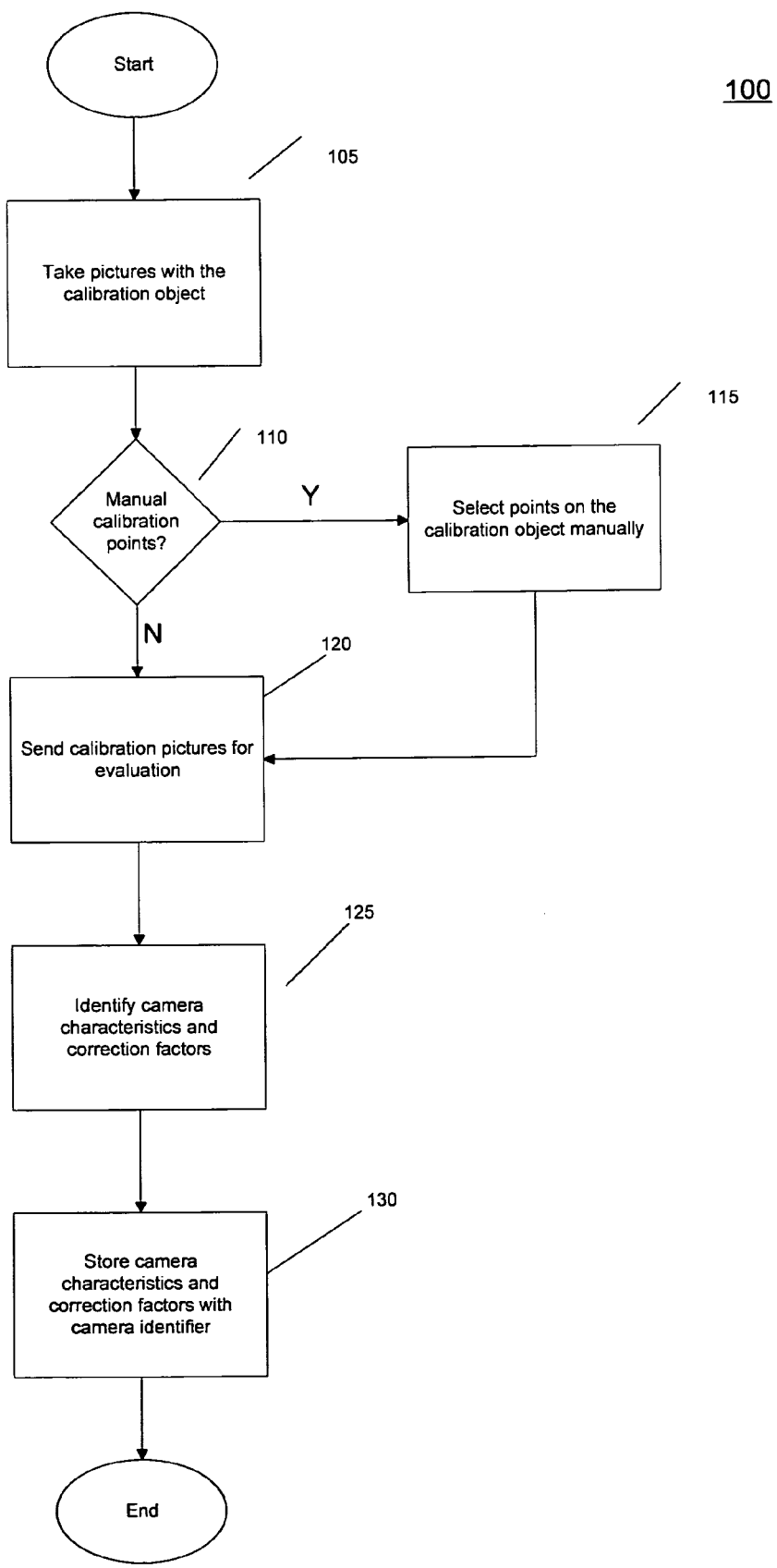
FIG. 1 is a flow diagram of a method to capture and store camera calibration characteristics in a central location in accordance with one embodiment of the present invention.

Different techniques for obtaining data and analyzing the obtained data can be used to employ photogrammetric algorithms to determine the extent of damage to a vehicle. Referring now to FIG. 1, shown is one embodiment of a process 100 of collecting camera calibration information. In one embodiment, the information may be provided from the camera to a central location for determining characteristic information and storing the information for later use. As shown in FIG. 1, a known calibration object is photographed to determine the intrinsic errors in the camera itself, as shown in block 105. Control is passed to decision diamond 110 to determine if the calibration points are to be selected manually from the calibration photo. If the calibration points are to be selected manually from the calibration photo, then control is passed to block 115 to allow the calibration points to be selected manually. Once the calibration points are identified, control is passed to block 120 to send the calibration photos for evaluation, e.g., at a central location. Then control passes to block 125 to determine the camera's internal characteristics and correction. If automatic calibration is to be used, control is passed from decision diamond 110 to block 120 to send the photos for evaluation. Then control is passed to block 125 to determine the camera's internal characteristics and correction factors. Once the optical characteristics for a camera are known, the camera can be identified and its parameters stored for future reference as shown in block 130.

Figure 2:
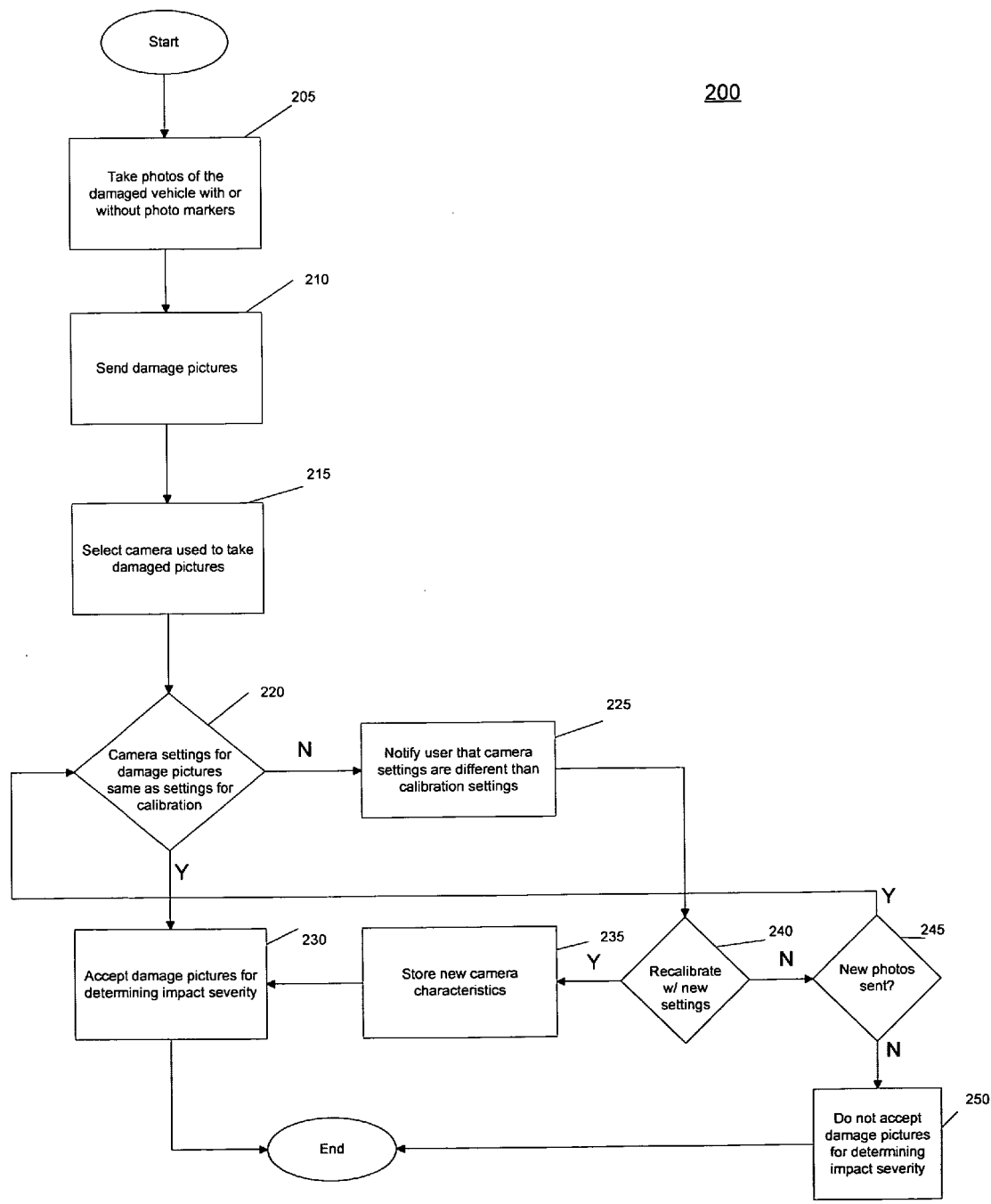
FIG. 2 is a flow diagram of a method of sending picture and camera information to a central location to conduct a photogrammetric analysis of vehicle damage in accordance with one embodiment of the present invention.

Referring now to FIG. 2, a flow diagram shows a process 200 of taking photos and sending a camera selection to a central location as one embodiment of the present invention. As shown in block 205, photos can be taken with markers to indicate points on the damaged vehicle or without markers. The photos can be sent via electronic means, such as a computer-to-computer communication to a central location as shown in block 210. As shown in block 215, information regarding the camera used to take the photos can be selected and sent via computer to a central location. Once the photos are received in the central location, control is passed to decision diamond 220 to evaluate the camera settings file that accompanies the photos. If the settings with the photos match the settings when the camera was calibrated (e.g., in accordance with the method of FIG. 1), then control is passed to block 230 and the photos are accepted for further evaluation. If the settings are different, then the person who took the photos is notified via electronic means (e.g., email) or via phone to recalibrate their camera to reflect the new settings (block 225) or send new photos with a previously calibrated and unaltered camera. Control is passed to decision diamond 240 to determine whether new calibration settings have been sent. If new calibration settings are sent, then the control is passed to block 235 and the new camera characteristics are stored. Control is subsequently passed to block 230. If new recalibration settings are not sent, then control passes to decision diamond 245 to evaluate whether new pictures have been sent. If new pictures have been sent, then control passes to decision diamond 220 to evaluate the camera settings file that accompanies the photos and the process of camera settings comparison repeats as discussed previously. If new photos are not sent, then control passes to block 250 and photos are not accepted for use in further evaluation.

Figure 3:
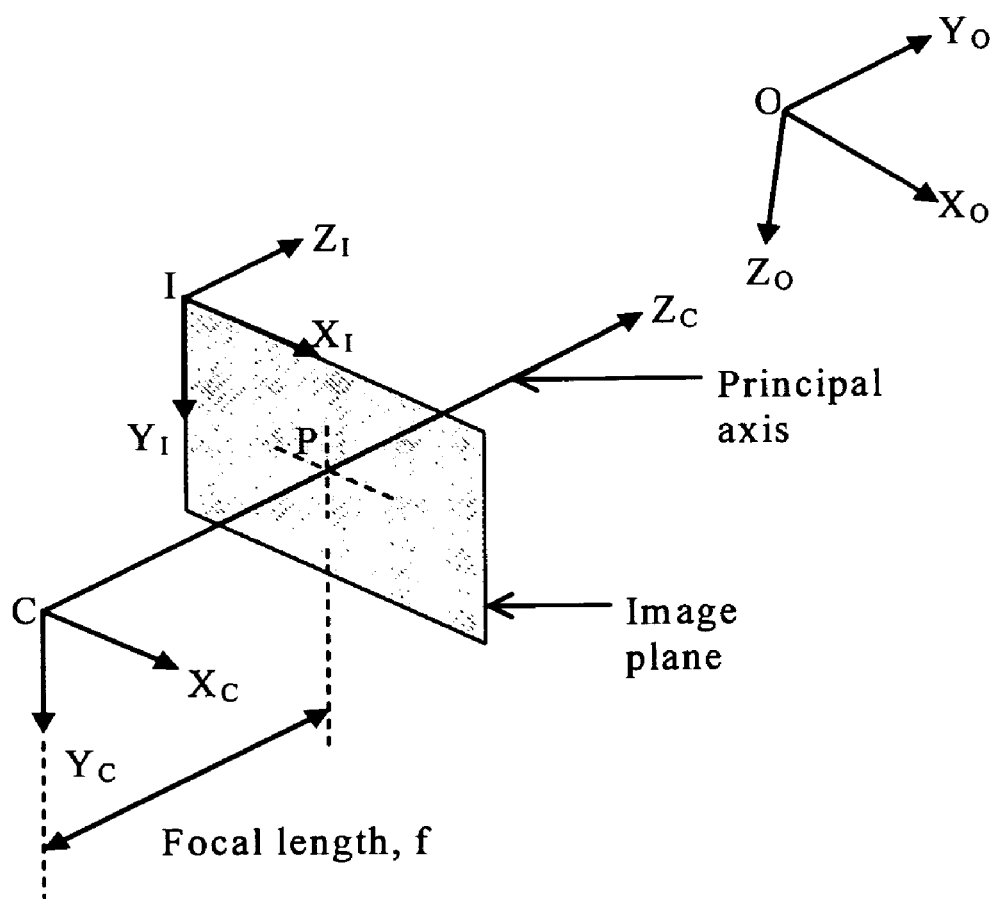
FIG. 3 is a diagram defining object, camera and image reference frames.

FIG. 3 shows the coordinate reference frames of the object, O, the camera, C, and the image, I. The extrinsic parameters map 3D coordinates in the object reference frame to 3D coordinates in the camera reference frame. Likewise, the intrinsic parameters map the 3D coordinates in the camera reference frame to the projected 2D coordinates in the image plane.

Given a 3D point, $P_o$, in the object's reference frame, its coordinates in the camera reference frame are given by:

$$P_c = RP_o + T_o$$

where R is a 3×3 rotation matrix and $T_o$ is the position of the object reference frame with respect to the camera. This can also be written as:

$$P_C = RP_O - RT_C = \begin{bmatrix} R & -RT_C \\ 0 & 1 \end{bmatrix} \begin{Bmatrix} P_O \\ 1 \end{Bmatrix}$$

where $T_c$ is the position of the camera reference frame with respect to the object.

Figure 4:
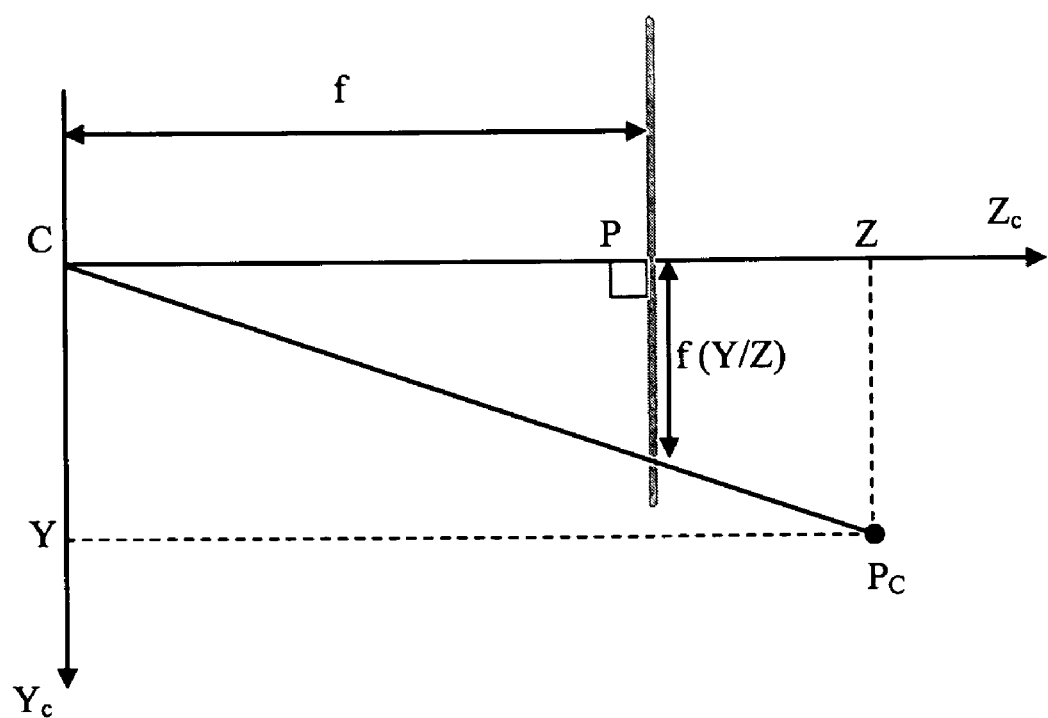
FIG. 4 is a diagram defining the relationship between the camera reference frame and the image plane.
Figure 5:
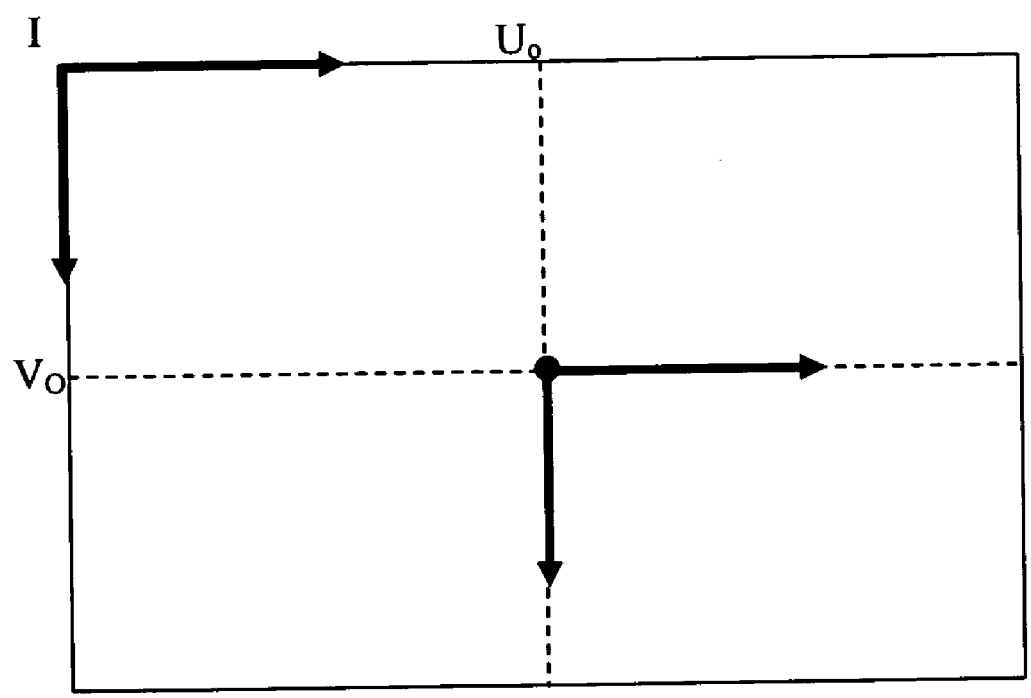
FIG. 5 shows the principal point offset.

FIG. 4 shows the relationship between the camera reference frame and the image plane. By way of similar triangles, it can be shown that the point, $P_c$, with coordinates (X,Y,Z) in the camera reference frame, projects to (fX/Z, fY/Z) on the image plane. Using homogenous coordinates, this can be expressed as the matrix multiplication:

$$P_{IC} = \begin{Bmatrix} fX \\ fY \\ Z \end{Bmatrix} = \begin{bmatrix} f & & 0 \\ & f & 0 \\ & & 1 & 0 \end{bmatrix} \begin{Bmatrix} X \\ Y \\ Z \\ 1 \end{Bmatrix}$$

where $P_{IC}$ indicates that the projected point is expressed with respect to the principal point of the image. Usually, the image coordinate system is offset from the principal point as shown in FIG. 5.

In non-homogenous coordinates, the image point is (fX/Z+$U_o$, fY/Z+$V_o$), which can be written as a matrix multiplication using homogenous coordinates, i.e., $$P_I = \begin{Bmatrix} fX + ZU_O \\ fY + ZV_O \\ Z \end{Bmatrix} = \begin{bmatrix} f & & U_O & 0 \\ & f & V_O & 0 \\ & & 1 & 0 \end{bmatrix} \begin{Bmatrix} X \\ Y \\ Z \\ 1 \end{Bmatrix}$$

Now, writing $$K = \begin{bmatrix} f & & U_O \\ & f & V_O \\ & & 1 \end{bmatrix}$$

Here, the matrix K is called the camera calibration matrix.

The entire mapping from object reference frame to image plane can be written as:

$$P_I = [K \; \vec{0}] \begin{bmatrix} R & -RT_C \\ 0 & 1 \end{bmatrix} \begin{Bmatrix} P_O \\ 1 \end{Bmatrix}$$

Or, more succinctly as:

$$P_I = K[R \; t] \begin{Bmatrix} P_O \\ 1 \end{Bmatrix} \text{ where } t = -RT_C$$

It should be noted that the intrinsic parameters are totally contained in the camera calibration matrix, K, while the extrinsic parameters are described by the [R t] matrix.

The pinhole camera model assumes image coordinates are Euclidean with equal scales in both directions. In the case of digital cameras, it is possible to have non-square pixels. It is also possible, albeit unlikely, that the pixels aren't perpendicular, i.e., the pixels are skew. In this case, the camera calibration matrix, K, can have the more general form:

$$K = \begin{bmatrix} f_X & s & U_O \\ & f_Y & V_O \\ & & 1 \end{bmatrix}$$

The terms $f_x$ and $f_y$ account for non-square pixels and s is the skew parameter. In most cases, the skew term will be zero.

Figure 6:
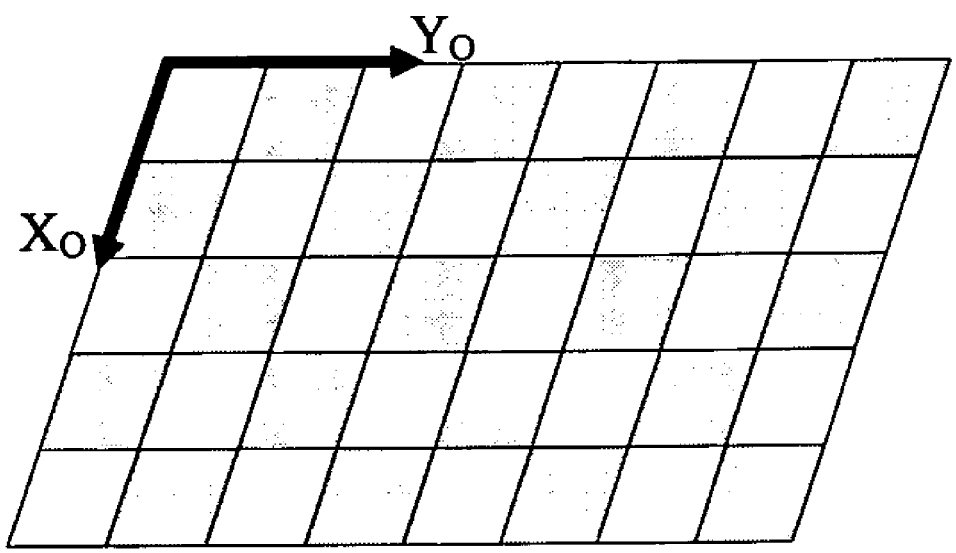
FIG. 6 shows an example of a planar calibration pattern.

The calibration procedure may begin by taking several images of a planar calibration pattern with precisely known geometry. For example, in one embodiment a calibration pattern may be a checkerboard pattern with regularly spaced rectangles or squares such as shown in FIG. 6.

If the object reference frame is chosen such that the XY plane is the plane (Z=0), then the relationship between image coordinates and object coordinates can be expressed as:

$$P_I = K[r_1 \; r_2 \; r_3 \; t] \begin{Bmatrix} P_{Ox} \\ P_{Oy} \\ 0 \\ 1 \end{Bmatrix} = K[r_1 \; r_2 \; t] \begin{Bmatrix} P_{Ox} \\ P_{Oy} \\ 1 \end{Bmatrix} \text{ or }$$

$$P_I = H \begin{Bmatrix} P_{Ox} \\ P_{Oy} \\ 1 \end{Bmatrix}$$

Here, the 3×3 matrix, H, is called a planar homography and it maps points from the calibration plane to their corresponding image coordinates. Given an image of the calibration pattern, this homography can be estimated.

Denoting the homography H=[$h_1$ $h_2$ $h_3$] gives $$[h_1 \; h_2 \; h_3] = K[r_1 \; r_2 \; t]$$

Since r1 and r2 are orthogonal, it can be shown that $$h_1^T K^{-T} K^{-1} h_2 = 0$$

$$h_1^T K^{-T} K^{-1} h_1 - h_2^T K^{-T} K^{-1} h_2 = 0$$

Defining ω as $\omega = K^{-T} K^{-1}$ gives $$h_1^T \omega h_2 = 0$$

$$h_1^T \omega h_1 - h_2^T \omega h_2 = 0$$

Here, $\omega$ is known as the image of the absolute conic.

In terms of the calibration matrix, $\omega$ can be expressed as:

$$\omega = K^{-T}K^{-1} = \begin{bmatrix} \omega_{11} & \omega_{12} & \omega_{13} \\ \omega_{21} & \omega_{22} & \omega_{23} \\ \omega_{31} & \omega_{32} & \omega_{33} \end{bmatrix} = \begin{bmatrix} \frac{1}{f_x^2} & 0 & -\frac{U_0}{f_x^2} \\ 0 & \frac{1}{f_y^2} & -\frac{V_0}{f_x^2} \\ -\frac{U_0}{f_x^2} & -\frac{V_0}{f_y^2} & \left(\frac{U_0^2}{f_x^2} + \frac{V_0^2}{f_y^2} + 1\right) \end{bmatrix}$$

Since $\omega$ is symmetric, it can be represented by the 6 vector $$\vec{\omega}\mathbf{x} = [\omega_{11}\,\omega_{12}\,\omega_{22}\,\omega_{13}\,\omega_{23}\,\omega_{33}]^T$$

Using the estimated homography of each calibration image and the constraints on the calibration matrix, a set of linear equations can be written in $\vec{\omega}$, i.e.

$$h_i^T \omega h_j = v_{ij}^T \vec{\omega}$$

where $v_{ij} = \lfloor h_{i1}h_{j1},\ h_{i1}h_{j2}+h_{i2}h_{j1},\ h_{i2}h_{j2},\ h_{i3}h_{j1}+h_{i1}h_{j3},\ h_{i3}h_{j2}+h_{i2}h_{j3},\ h_{i3}h_{j3} \rfloor$ Therefore, the constraints on each homography result in the following linear system $$\begin{bmatrix} v_{12}^T \\ (v_{11}-v_{22})^T \end{bmatrix} \vec{\omega} = V\vec{\omega} = \vec{0}$$

For n images, the matrix V is a 2n×6 matrix. This system can be solved if there are at least 3 images of the calibration plane.

Figure 7:
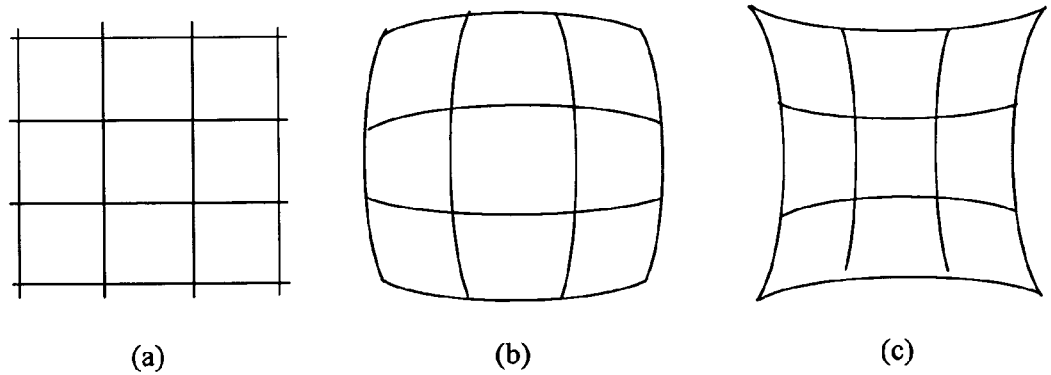
FIGS. 7 A-C show examples of an undistorted image and lens distorted images.

The pinhole camera model is an idealized camera model. Real cameras have imperfect lenses that produce nonlinear effects. For example, when the magnification of a lens differs at its edges and at its center, the image of a square object will be distorted. If the magnification is lower at the edges than at the center, a square object will appear to have rounded edges. This type of distortion is called "barrel" distortion. If the magnification is greater at the edges than at the center, the image will exhibit "pincushion" distortion. FIGS. 7A-C illustrate both of these radial distortion effects, along with an undistorted image.

Radial distortion can be corrected using a nonlinear distortion factor. Studies have shown that the distortion can be modeled as a polynomial with respect to the squared radial distance, i.e., $$\begin{bmatrix} \delta u \\ \delta v \end{bmatrix} = \begin{bmatrix} \tilde{u}(k_1 r^2 + k_2 r^4 + \ldots) \\ \tilde{v}(k_1 r^2 + k_2 r^4 + \ldots) \end{bmatrix}$$

where $(\delta u, \delta v)$ is the amount of distortion in the x and y-directions, respectively, $(\tilde{u}, \tilde{v})$ is an image point projected via the pinhole camera model, $k_1, k_2, \ldots$ are the distortion coefficients, and $r = \sqrt{\tilde{u}^2 + \tilde{v}^2}$ is the radius.

Thus, the pinhole camera model can be extended to include nonlinear distortion, i.e., $$\begin{bmatrix} u \\ v \end{bmatrix} = \begin{bmatrix} f_X(\tilde{u}+\delta u) \\ f_Y(\tilde{v}+\delta v) \end{bmatrix} + \begin{bmatrix} U_0 \\ V_0 \end{bmatrix}$$

$$\begin{bmatrix} u \\ v \end{bmatrix} = \begin{bmatrix} f_X \tilde{u}(1 + k_1 r^2 + k_2 r^4) \\ f_Y \tilde{v}(1 + k_1 r^2 + k_2 r^4) \end{bmatrix} + \begin{bmatrix} U_0 \\ V_0 \end{bmatrix}$$

It has been shown that radial distortion is adequately modeled by the first two polynomial terms; thus, the higher order terms have been dropped.

To calculate the optimal camera calibration parameters, the problem is posed as a nonlinear minimization problem. Given n images of a calibration target with m points, the objective is to minimize the reprojection error, i.e., $$f = \sum_{i=1}^{n} \sum_{j=1}^{m} \left\| m_{ij} - \tilde{m}(K, k_1, k_2, R_i, t_i, P_j) \right\|$$

where $\tilde{m}(K, k_1, k_2, R_i, t_i, P_j)$ is the projection of point $P_j$ in image i. This nonlinear minimization problem is solved via the Levenberg-Marquardt Algorithm.

Of the non-linear least squares algorithms, the Levenberg-Marquardt (LM) algorithm has been the most popular because of its tolerance to missing data and its convergence properties. The basis for the LM algorithm is a linear approximation of the objective function in the neighborhood of the control variables. For a small perturbation of the control variables, $\delta_p$, a Taylor series expansion yields a linear approximation for the residual, i.e., $$f(p+\delta_p) \approx f(p) + J\delta_p$$

The gradient of this form of the objective function is given by $$g = J^T f(p+\delta_p) = J^T [f(p) + J\delta_p]$$

Setting the gradient to zero yields the so-called normal equations, i.e., $$J^T J \delta_p = J^T f(p)$$

Solving this linear system gives the $\delta_p$ that is a local minimizer of the objective function.

The LM algorithm uses a slightly different version of these equations called the augmented normal equations, i.e., $$N\delta_p = J^T f(p)$$

The off-diagonal elements of the matrix N are the same as the corresponding elements of the $J^T J$ matrix, but the diagonal elements of N are given by $$N_{ii} = \mu + [J^T J]_{ii} \text{ for some } \mu > 0.$$

This strategy of altering the diagonal elements is called damping and the factor, $\mu$, is called the damping term. If the solution of the normal equations yields a new parameter estimate that reduces the value of the objective function, the update is accepted and the process is repeated with a decreased damping term. Otherwise, the damping term is increased and the normal equations are solved again until the objective function is decreased. In a single iteration of the LM algorithm, the normal equations are solved until an acceptable parameter estimate is found.

The augmented normal equations can also be written as the following linear system:

$$(H+\mu I)\delta_p = g$$

where H is the Gauss-Newton approximation of the Hessian, $J^T J$, and I is the identity matrix with the same size as H.

The LM algorithm terminates when one of three stopping criteria are met: (1) The norm of the gradient of the residual, i.e. $j^T f(p)$, falls below a threshold, $\epsilon_1$; (2) The relative change in the step size falls below a threshold, $\epsilon_2$; and (3) The number of LM iterations exceeds some maximum value, $k_{max}$.

Table 1 shows pseudocode for a LM algorithm in accordance with one embodiment of the present invention.

TABLE 1

```
iterations = 0;
p = p0;
residual = x - f(p);
error = | residual |;
H = J^T J; // Hessian (Gauss-Newton approximation)
g = J^T residual; // Gradient
Converged = ( |Grad| < el );
μ = maximum diagonal element of Hessian;
while (not converged) and (iterations < max_iterations)
    accept_step = false;
    while (not accept_step) and (not converged)
        // Solve normal equations step = solution of  (H + μI)δ_p = g // Evaluate error, Gradient, and Hessian at new step
        p_new = p + step;
        residual_new = x - f(p_new);
        error_new = | residual_new |;
        H_new = J_new^T J_new;
        g_new = J_new^T residual_new;
        // Check step against threshold
        if ( |step| < e2|p| )
            converged = true;
        else
            // Check acceptability of step
            accept_step = error_new < error;
            if (accept_step)
                // Accept step.
                // Update control variables, error,
                // Hessian, Gradient, and damping parameter.
                p = p_new;
                error = error_new;
                H = H_new;
                g = g_new;
                μ = μ / 10;
            else
                // Reject step and update damping parameter.
                μ = μ * 10;
        end;
    end;
    endwhile
    // Convergence test based on Gradient norm
    convergence = ( |Grad| < el)
    // Update iteration count
    iterations = iterations + 1;
endwhile
```

This section describes a technique whereby the structure of the Jacobian matrix can be exploited to reduce the overall complexity of a system and greatly improve the computational performance.

For illustrative purposes, the following will be applied to bundle adjustment; however, the technique can be applied to camera calibration, the pose estimation problem, and many other computer vision problems.

Assume that n 3D points are visible in m images. Let $\hat{x}_{ij}$ represent the projection of point i on image j. Let $a_j$ represent the control variables of each camera j and let $b_i$ represent the control variables for each 3D point i.

For n points in m images, the observed image points are $$x = (x_{11}^T, \ldots, x_{1m}^T, \ldots, x_{21}^T, \ldots, x_{n1}^T, \ldots, x_{nm}^T)^T$$

Similarly, the estimated (projected) image points of the n 3D points are given by $$\hat{x} = (\hat{x}_{11}^T, \ldots, \hat{x}_{1m}^T, \ldots, \hat{x}_{21}^T, \ldots, \hat{x}_{2m}^T, \ldots, \hat{x}_{n1}^T, \ldots, \hat{x}_{nm}^T)^T$$

where each $\hat{x}_{ij} = Q(a_j, b_i)$ is a predicted image point from a mathematical camera model, e.g. pinhole projection model. The error or residual vector is defined as $$\epsilon = x - \hat{x}$$

The control variables are partitioned by the vector $$P = (a_1^T, \ldots, a_m^T, b_1^T, \ldots, b_m^T)^T$$

For simplicity, the Jacobian for n=4 points in m=3 views is given by $$J = \frac{\partial \hat{x}(P)}{\partial P} = \begin{pmatrix} A_{11} & 0 & 0 & B_{11} & 0 & 0 & 0 \\ 0 & A_{12} & 0 & B_{12} & 0 & 0 & 0 \\ 0 & 0 & A_{13} & B_{13} & 0 & 0 & 0 \\ A_{21} & 0 & 0 & 0 & B_{21} & 0 & 0 \\ 0 & A_{22} & 0 & 0 & B_{22} & 0 & 0 \\ 0 & 0 & A_{23} & 0 & B_{23} & 0 & 0 \\ A_{31} & 0 & 0 & 0 & 0 & B_{31} & 0 \\ 0 & A_{32} & 0 & 0 & 0 & B_{32} & 0 \\ 0 & 0 & A_{33} & 0 & 0 & B_{33} & 0 \\ A_{41} & 0 & 0 & 0 & 0 & 0 & B_{41} \\ 0 & A_{42} & 0 & 0 & 0 & 0 & B_{42} \\ 0 & 0 & A_{43} & 0 & 0 & 0 & B_{43} \end{pmatrix}$$

where $$A_{ij} = \frac{\partial \hat{x}_{ij}}{\partial a_j} \text{ and } B_{ij} = \frac{\partial \hat{x}_{ij}}{\partial b_i}$$

The first m columns of the Jacobian are the partial derivatives of the image residuals with respect to the parameters of camera j. Since the camera parameters for one image do not affect the projected image points of other images, there are numerous zeros in these columns. Similarly, the last n columns of the Jacobian are the partial derivatives of the image residuals with respect to the 3D structure parameters. These columns also have numerous zeros because of the lack of interaction between parameters. Reconsider the normal equations, i.e., $$J^T J \delta = J^T \epsilon$$

The left hand side of the normal equations is given by $$J^T J = \begin{pmatrix} \sum_i A_{i1}^T A_{i1} & 0 & 0 & A_{11}^T B_{11} & A_{21}^T B_{21} & A_{31}^T B_{31} & A_{41}^T B_{41} \\ 0 & \sum_i A_{i2}^T A_{i2} & 0 & A_{12}^T B_{12} & A_{22}^T B_{22} & A_{32}^T B_{32} & A_{42}^T B_{42} \\ 0 & 0 & \sum_i A_{i3}^T A_{i3} & A_{13}^T B_{13} & A_{23}^T B_{23} & A_{33}^T B_{33} & A_{43}^T B_{43} \\ B_{11}^T A_{11} & B_{12}^T A_{12} & B_{13}^T A_{13} & \sum_j B_{1j}^T B_{1j} & 0 & 0 & 0 \\ B_{21}^T A_{21} & B_{22}^T A_{22} & B_{33}^T A_{33} & 0 & \sum_j B_{2j}^T B_{2j} & 0 & 0 \\ B_{31}^T A_{31} & B_{32}^T A_{32} & B_{33}^T A_{33} & 0 & 0 & \sum_j B_{3j}^T B_{3j} & 0 \\ B_{41}^T A_{41} & B_{42}^T A_{42} & B_{43}^T A_{43} & 0 & 0 & 0 & \sum_j B_{4j}^T B_{4j} \end{pmatrix}$$

And the right hand side is given by $$J^T \varepsilon = \begin{pmatrix} \sum_i A_{i1}^T \varepsilon_{i1} \\ \sum_i A_{i2}^T \varepsilon_{i2} \\ \sum_i A_{i3}^T \varepsilon_{i3} \\ \sum_j B_{1j}^T \varepsilon_{1j} \\ \sum_j B_{2j}^T \varepsilon_{2j} \\ \sum_j B_{3j}^T \varepsilon_{3j} \\ \sum_j B_{4j}^T \varepsilon_{4j} \end{pmatrix}$$

Substituting $U_j$, $V_i$, $W_{ij}$, $\varepsilon_{aj}$ and $\varepsilon_{bi}$ for $\sum_i A_{ij}^T A_{ij}$, $\sum_j B_{ij}^T B_{ij}$, $A_{ij}^T B_{ij}$, $\sum_i A_{ij}^T \varepsilon_{ij}$ and $\sum_j B_{ij}^T \varepsilon_{ij}$ respectively, the normal equations can be written in a more compact form, i.e., $$\begin{pmatrix} U_1 & 0 & 0 & W_{11} & W_{21} & W_{31} & W_{41} \\ 0 & U_2 & 0 & W_{12} & W_{22} & W_{32} & W_{42} \\ 0 & 0 & U_3 & W_{13} & W_{23} & W_{33} & W_{43} \\ W_{11}^T & W_{12}^T & W_{13}^T & V_1 & 0 & 0 & 0 \\ W_{21}^T & W_{22}^T & W_{23}^T & 0 & V_2 & 0 & 0 \\ W_{31}^T & W_{32}^T & W_{33}^T & 0 & 0 & V_3 & 0 \\ W_{41}^T & W_{42}^T & W_{43}^T & 0 & 0 & 0 & V_4 \end{pmatrix} \begin{pmatrix} \delta_{a1} \\ \delta_{a1} \\ \delta_{a1} \\ \delta_{b1} \\ \delta_{b2} \\ \delta_{b3} \\ \delta_{b4} \end{pmatrix} = \begin{pmatrix} \varepsilon_{a1} \\ \varepsilon_{a2} \\ \varepsilon_{a3} \\ \varepsilon_{b1} \\ \varepsilon_{b2} \\ \varepsilon_{b3} \\ \varepsilon_{b4} \end{pmatrix}$$

The normal equations can be written in even more compact form, i.e., $$\begin{pmatrix} U^* & W \\ W^T & V^* \end{pmatrix} \begin{pmatrix} \delta_a \\ \delta_b \end{pmatrix} = \begin{pmatrix} \varepsilon_a \\ \varepsilon_b \end{pmatrix} \text{ where } U^* = \begin{pmatrix} U_1^* & 0 & 0 \\ 0 & U_2^* & 0 \\ 0 & 0 & U_3^* \end{pmatrix},$$

$$V^* = \begin{pmatrix} V_1^* & 0 & 0 & 0 \\ 0 & V_2^* & 0 & 0 \\ 0 & 0 & V_3^* & 0 \\ 0 & 0 & 0 & V_4^* \end{pmatrix}, \text{ and } W = \begin{pmatrix} W_{11} & W_{21} & W_{31} & W_{41} \\ W_{12} & W_{22} & W_{32} & W_{42} \\ W_{13} & W_{23} & W_{33} & W_{43} \end{pmatrix}$$

The $*$ indicates that the diagonal elements are augmented for the LM algorithm.

Multiplying the compact form of the augmented normal equations by $$\begin{pmatrix} I & -WV^{*-1} \\ W^T & V^* \end{pmatrix}$$

results in $$\begin{pmatrix} U^* - WV^{*-1}W^T & 0 \\ W^T & V^* \end{pmatrix} \begin{pmatrix} \delta_a \\ \delta_b \end{pmatrix} = \begin{pmatrix} \varepsilon_a - WV^{*-1}\varepsilon_b \\ \varepsilon_b \end{pmatrix}$$

Since the upper right block of the left hand matrix is zero, the $\delta_a$ vector can be determined by solving the upper j set of equations, i.e., $$(U^* - WV^{*-1}W^T)\delta_a = \varepsilon_a - WV^{*-1}\varepsilon_b$$

After solving for $\delta_a$, $\delta_b$ can be solved by backsubstitution into the bottom i set of equations. Denoting $Y_{ij} = W_{ij}V^*_i{}^{-1}$, the upper j set of equations becomes $$\begin{pmatrix} U_1^* - \sum_i Y_{i1}W_{i1}^T & -\sum_i Y_{i1}W_{i2}^T & -\sum_i Y_{i1}W_{i3}^T \\ -\sum_i Y_{i2}W_{i1}^T & U_2^* - \sum_i Y_{i2}W_{i2}^T & -\sum_i Y_{i2}W_{i3}^T \\ -\sum_i Y_{i3}W_{i1}^T & -\sum_i Y_{i3}W_{i2}^T & U_3^* - \sum_i Y_{i3}W_{i3}^T \end{pmatrix} \begin{pmatrix} \delta_{a1} \\ \delta_{a2} \\ \delta_{a3} \end{pmatrix} =$$

$$\begin{pmatrix} \varepsilon_{a1} - \sum_i Y_{i1} - \varepsilon_{bi} \\ \varepsilon_{a2} - \sum_i Y_{i2} - \varepsilon_{bi} \\ \varepsilon_{a3} - \sum_i Y_{i3} - \varepsilon_{bi} \end{pmatrix}$$

which can be solved for $\delta_a$. Each $\delta_{bi}$ is then given by $$\delta_{bi} = V_i^{*-1}\left(\varepsilon_{bi} - \sum_j w_{ij}^T \delta_{aj}\right)$$

Table 2 summarizes the technique, which can be generalized to n points in m views.

TABLE 2

1. Compute the derivative matrices, $$A_{ij} = \frac{\partial \hat{x}_{ij}}{\partial a_j} \text{ and } B_{ij} = \frac{\partial \hat{x}_{ij}}{\partial b_i},$$

and error vector $\epsilon_{ij} = x_{ij} - \hat{x}_{ij}$

2. Compute the intermediate expressions $$U_j = \sum_i A_{ij}^T A_{ij} \quad V_i = \sum_j B_{ij}^T B_{ij} \quad W_{ij} = A_{ij}^T B_{ij},$$

$$\varepsilon_{aj} = \sum_i A_{ij}^T \epsilon_{ij} \quad \varepsilon_{bi} = \sum_j B_{ij}^T \epsilon_{ij}$$

Figure 8:
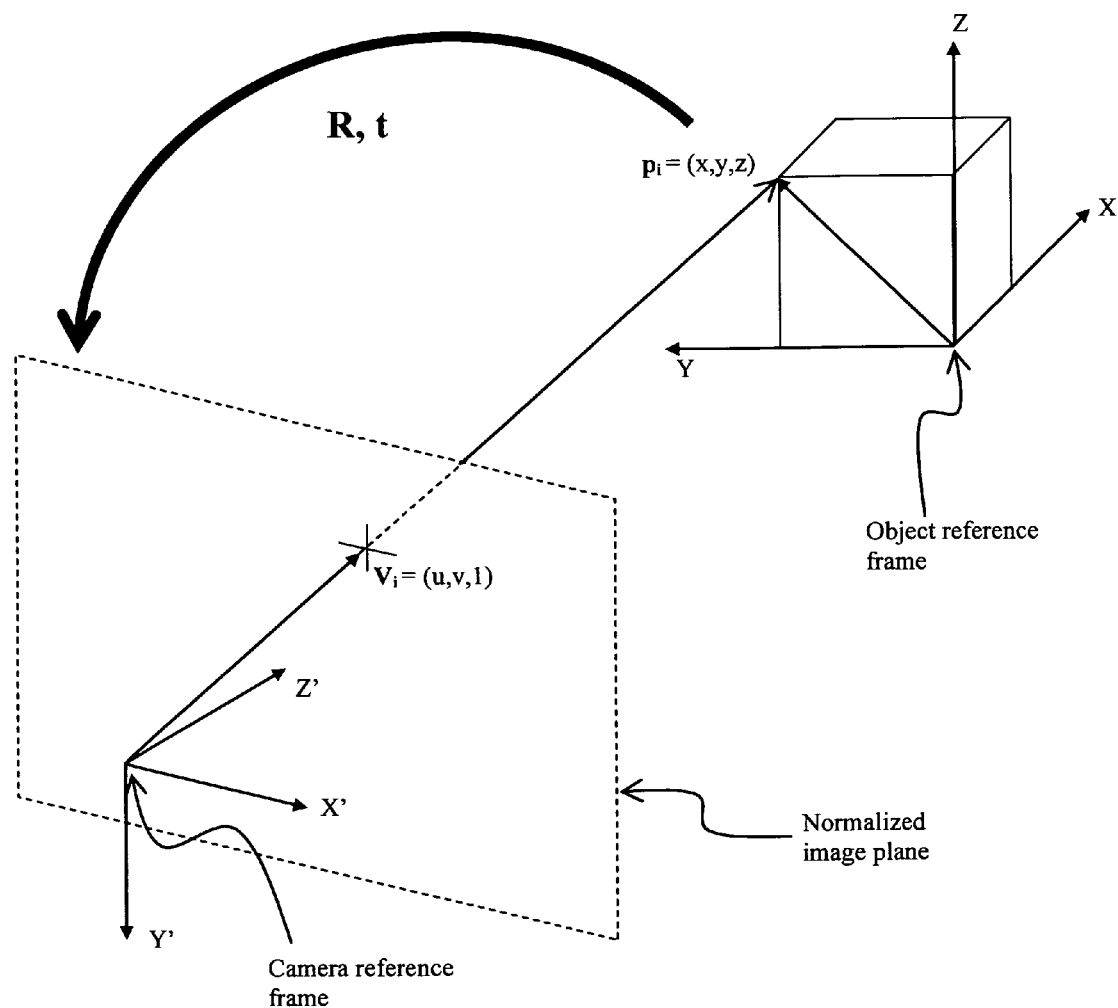
FIG. 8 is a conceptual diagram of the transformation from the object to the camera space.

3. Multiply the diagonals of U and V by $1 + \mu$
4. Compute the inverse of V. Since V is not used again, it can be replaced by the inverse.
5. Find $\delta_a$ by solving $(U^* - WV^{*-1}W^T)\delta_a = \epsilon_a - WV^{*-1}\epsilon_b$
6. Find $\delta_b$ by backsubstitution Estimating the spatial relationship between the object and the camera, or the pose estimation problem, is a central issue in close-range photogrammetry and computer vision applications. The goal is to determine the rigid transformation that relates the object and camera reference frames. Typically, this rigid transformation is parameterized by a rotation matrix, R, and a translation, t. FIG. 8 illustrates this transformation.

The data used to solve this problem are a set of point correspondences -3D coordinates of the object, or "control points" and their 2D projections onto the image plane. Typically, the control points are expressed with respect to the object reference frame and their projections are expressed with respect to the camera reference frame. The algorithm described herein is based on the work by Hager, et al.

Given a set of at least 3 control points, $\{p_i\}$, the corresponding camera space coordinates, $\{q_i\}$, are given by:

$$q_i = Rp_i + t$$

The camera reference frame is chosen such that the origin is at the center of projection and the optical axis is in the positive z-direction. The control points are projected onto the plane in the camera reference frame where z=1, the so-called normalized image plane. In the camera reference frame, the control points are given by:

$$\begin{Bmatrix} q_{ix} \\ q_{iy} \\ q_{iz} \end{Bmatrix} = \begin{Bmatrix} r_1^T p_i + t_x \\ r_2^T p_i + t_y \\ r_3^T p_i + t_z \end{Bmatrix}$$

where $r_1^T$, $r_2^T$, and $r_3^T$ are the rows of the rotation matrix, R. If a ray is drawn from the camera reference frame origin to the control point, it intersects the normalized image plane at the point $V_i = (u_i, v_i, 1)$. This can be expressed as:

$$u_i = \frac{r_1^T p_i + t_x}{r_3^T p_i + t_z}$$

$$v_i = \frac{r_2^T p_i + t_y}{r_3^T p_i + t_z}$$

Or $$V_i = \frac{1}{r_3^T p_i + t_z}(Rp_i + t)$$

This is known as the collinearity equation. In classical photogrammetry, the collinearity equation is often used as the basis for solving the pose estimation problem. The pose is iteratively refined such that the image residual is minimized, i.e., $$\min_{R,t} \sum_{i=1}^{n} \left[\left(\hat{u}_i - \frac{r_1^T p_i + t_x}{r_3^T p_i + t_z}\right)^2 + \left(\hat{v}_i - \frac{r_2^T p_i + t_y}{r_3^T p_i + t_z}\right)^2\right]$$

Here, $(\hat{u}_i, \hat{v}_i)$ are the coordinates of the control point observed in the normalized image plane.

Figure 9:
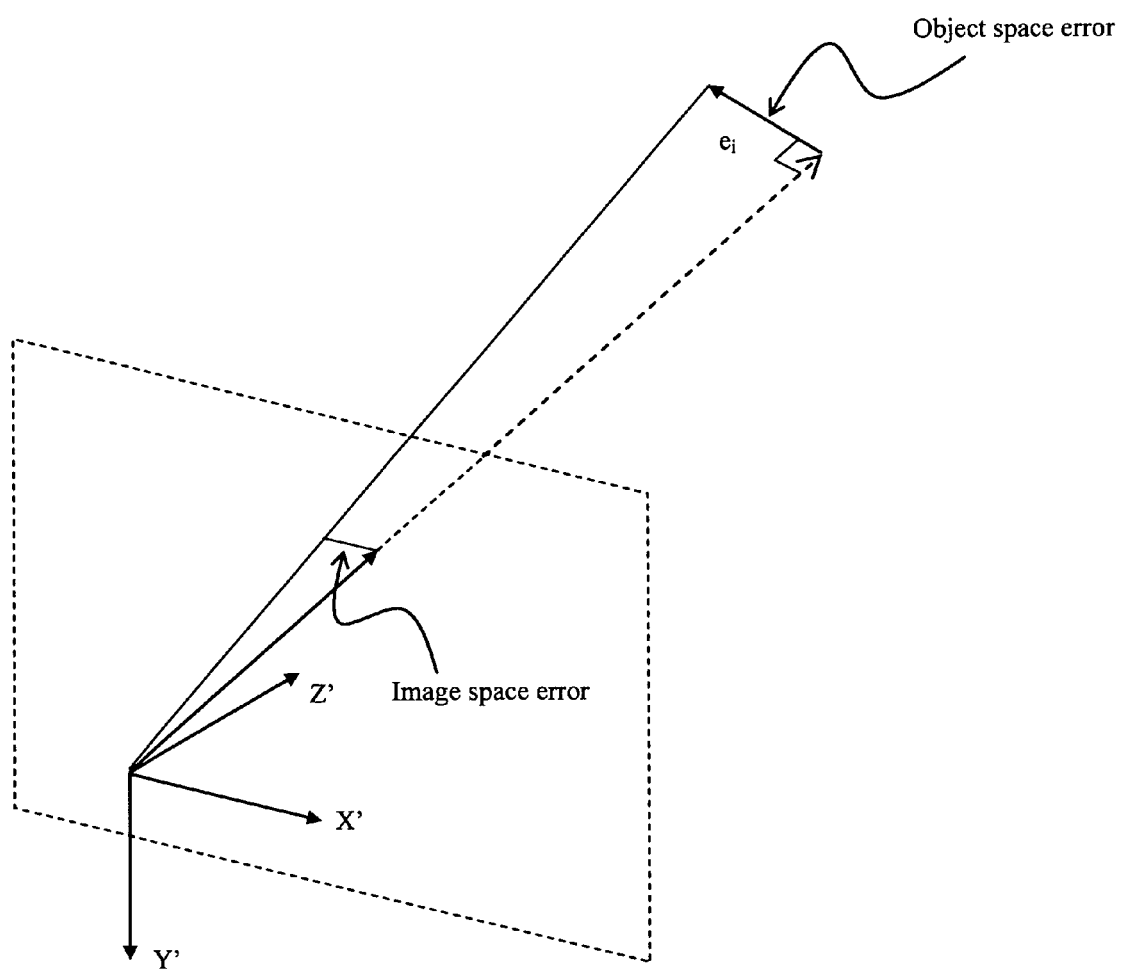
FIG. 9 is a diagram defining the error in image space and object space.

This problem can also be expressed in terms of minimizing the overall residual in object space as shown in FIG. 9. The line-of-sight projection matrix is defined as:

$$\hat{V}_i = \frac{\hat{v}_i \hat{v}_i^T}{\hat{v}_i^T \hat{v}_i}$$

When a scene point is multiplied by this matrix, it projects the point orthogonally to the line of sight defined by the image point $\hat{v}_i$. In the presence of error, there will be a residual vector between the scene point, $q_i$ and its orthogonal projection, i.e., $$e_i = \hat{V}_i(Rp_i + t) - (Rp_i + t)$$

Therefore, the optimal camera pose is that which minimizes the overall residual in object space, i.e., $$\min_{R,t} \sum_{i=1}^{n} \|e_i\|^2 = \|(I - \hat{V}_i)(Rp_i + t)\|^2$$

If the camera space coordinates of the control points could be obtained by other means, e.g. digitized with a FARO arm, then each control point is related by the rigid transformation:

$$q_i = Rp_i + t$$

Given at least 3 or more non-collinear control points, R and t can be obtained by solving the least-squares problem:

$$\min_{R,t} \|Rp_i + t - q_i\|^2, \text{ subject to } R^T R = I$$

This type of constrained least-squares problem can be solved analytically using singular value decomposition (SVD). Defining the centroids of the camera and scene points as:

$$\bar{q} = \frac{1}{n}\sum_{i=1}^{n} q_i$$

$$\bar{p} = \frac{1}{n}\sum_{i=1}^{n} p_i$$

And defining the position of camera and scene points, relative to their centroids as:

$$q'_i = \bar{q} - q_i$$

$$p'_i = \bar{p} - p_i$$

The sample cross covariance is $$\frac{1}{n}M, \text{ where } M = q' \cdot p' = \sum_{i=1}^{n} q'_i p'^T_i$$

If R* and t* are the optimal rotation and translation, then they must satisfy $$R^* = \arg\max_R \text{trace}(R^T M)$$

$$t^* = \bar{q} - R^*\bar{p}$$

Let $(U, \Sigma, V)$ be a SVD of M, then the solution of R* is given by $$R^* = VU^T$$

Thus, the only data required to calculate the optimal rotation matrix are the 3D coordinates (in camera and object space) relative to their centroids. The optimal translation is then a simple function of the optimal rotation and the centroids.

In one embodiment, an algorithm may be referred to as the orthogonal iteration (01) algorithm. This approach is to use the object-space collinearity error and restructure the problem so that it resembles the absolute orientation problem. The first step is to define the objective function based on object-space error, i.e., $$E(R, t) = \sum_{i=1}^{n} \|e_i\|^2 = \|(I - \hat{V}_i)(Rp_i + t)\|^2$$

Since the objective function is quadratic in t, the optimal translation can be calculated in closed-form as:

$$t(R) = \frac{1}{n}\left(I - \frac{1}{n}\sum_j \hat{V}_j\right)^{-1} \sum_j (V_j - I)Rp_j$$

Defining $$q_i(R) = \hat{V}_i[Rp_i + t(R)]$$

Then the objective function can be rewritten in the following form:

$$E(R) = \sum_{i=1}^{n} \|Rp_i + t(R) - q_i(R)\|^2$$

This equation has the same form as the absolute orientation problem; however, SVD cannot be used to solve for R because the sample cross covariance is also a function of R, i.e., $$M(R) = q'(R) \cdot p' = \sum_{i=1}^{n} q'_i(R) p'^T_i$$

where $p'_i = p_i - \bar{p}$ and $q'_1(R) = q_i(R) - \bar{q}(R)$

Instead, the following iterative approach is used. Given the $k^{th}$ estimate $R^{(k)}$, $t^{(k)} = t(R^{(k)})$, and $q_i^k R^{(k)} p_i + t^{(k)}$, the $(k+1)^{th}$ estimate of R, $R^{(k+1)}$ is obtained by solving the following absolute orientation problem:

$$R^{(k+1)} = \arg\min_R \sum_{i=1}^{n} \|Rp_i + t - \hat{V}_i q_i^{(k)}\|^2$$

$$= \arg\max_R \text{trace}[R^{(k)T} M(R^{(k)})]$$

Then, the $(k+1)^{th}$ estimate of t is given by $$t^{(k+1)} = t(R^{(k+1)})$$

This process is repeated until the estimate of R satisfies:

$$R^* = \arg\min_R \sum_{i=1}^{n} \|Rp_i + t - \hat{V}_i(R^* p_i + t(R^*))\|^2$$

within some specified tolerance.

Figure 10:
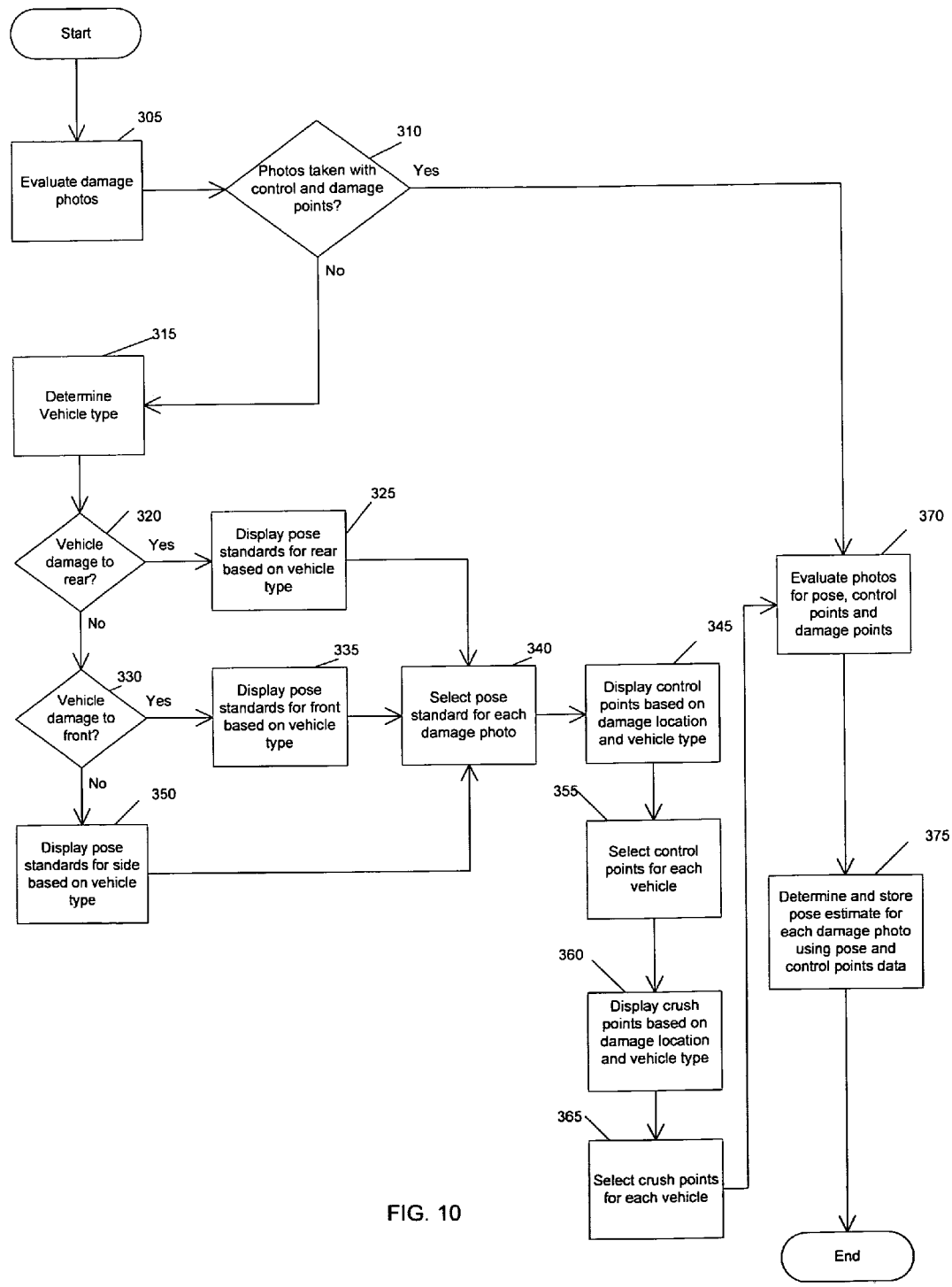
FIG. 10 is a flow diagram of a method of evaluating photos using photogrammetry techniques in accordance with one embodiment of the present invention.

Referring now to FIG. 10, photos of a vehicle involved in an accident may be analyzed. As shown in FIG. 10, method 300 may begin by receiving photos in a computer system at a central location and which can be evaluated to determine if they were taken with or without markers in the photos, as shown in block 305. More specifically, in decision diamond 310, the computer evaluates whether markers including, for example, control points and damage points, were included in the photos. Various markers may be used.

Referring still to FIG. 10, if the photos were taken with markers, control is passed to block 370, and the location of pose, control points and damage points can be determined automatically by finding the points in the photos via an algorithm. Automatic target recognition may be used in photogrammetric systems to reduce the amount of user interaction and to increase measurement accuracy. Targets can be automatically detected by examining variations in image intensity levels. Targets made from retro-reflective material are often used because they reflect significantly more light than a normal white textured surface. In some implementations, a circular retro-reflective target can be used. The first step in identifying the location of the target is to find areas within the image where the image intensity is rapidly changing. In some embodiments, the change in intensity can be defined by the steepness or the slope of the image intensity, which is also known as the image gradient. Images of retro-reflective targets are characterized by large image gradients.

After candidate regions (i.e., areas with large image gradients) have been identified, the next step is to check the geometry of the region. For circular targets, candidate regions can be verified by comparing them with an ellipse. Points on the perimeter of candidate regions are used to calculate the least-squares fit of an ellipse. Spurious regions are eliminated if the region perimeter does not fit the ellipse within some statistical measure.

Once candidate regions have been identified, the final step is to locate the center of the target. One commonly used estimate for this center is the intensity-weighted centroids, which is defined by $$\begin{pmatrix} x_c \\ y_c \end{pmatrix} = \frac{\sum_{i=1}^{n} \sum_{j=1}^{m} g_{ij} \begin{pmatrix} x_i \\ y_j \end{pmatrix}}{\sum_{i=1}^{n} \sum_{j=1}^{m} g_{ij}}$$

where $x_i$, $y_i$ are the pixel coordinates and $g_{ij}$ are the intensity levels within a (n×m) window covering the target region.

Note the pose helps set the frame of reference regarding which direction the pictures were taken relative to the vehicle. For example, the pose determines if the photo was taken from the driver's or passenger's side of the vehicle. Once the frame of reference is determined, then points of known location are identified to help determine the scale of the photo from known vehicle dimensions. These control points could include areas of the vehicle that are unlikely to be damaged in an accident such as the four corners of the windshield, the center of the wheel axle, etc. Finally, the points of potential damage can be located on each picture that is taken. For example, a standard set of points on the hood, grille and bumper may be identified on each of the different views of the front of a vehicle. Control is then passed to block 375 to store the estimate of the pose for each of the photos using the pose and control point data. Such stored pose estimates may be later used in determining a crush profile for the vehicle associated with the estimates.

Still referring to FIG. 10, if the photos were taken without markers, control is passed to block 315, to determine the appropriate vehicle example photos to display to allow manual input of the pose for each photo. Control is passed to decision diamond 320 to determine if the damage was to the rear of the vehicle. If the damage was to the rear of the vehicle, control is passed to block 325 to display the rear of an appropriate vehicle to allow pose to be selected. If the damage was not to the rear of the vehicle, then control is passed to decision diamond 330 to determine if the damage was to the front of the vehicle. If the damage was to the front of the vehicle, control is passed to block 335 to display the front of an appropriate vehicle to allow pose to be selected. If the damage was not to the front of the vehicle, control is passed to block 350 to display the side of an appropriate vehicle to allow pose to be selected.

Still referring to FIG. 10, control is passed to block 340 for user manual selection of the pose for each photo. Once pose has been selected, control is passed to block 345 to display control points for each of the photos. This may be performed based on the location of damage to the vehicle as well as the type of vehicle. For example, control points may be placed on the four corners of the back windshield for a vehicle involved in a rear collision. Once control points are displayed, control is passed to block 355 where the control points are selected by the user and manually placed on each vehicle picture. Control is passed to block 360 to display the crush points for the vehicle, which may also be based on damage location and vehicle type. Control is then passed to block 365 where the crush points are manually placed on each of the photos. Control is passed to block 370 to evaluate the photos for pose, control points and damage points. Control is then passed to block 375, discussed above.

Figure 11:
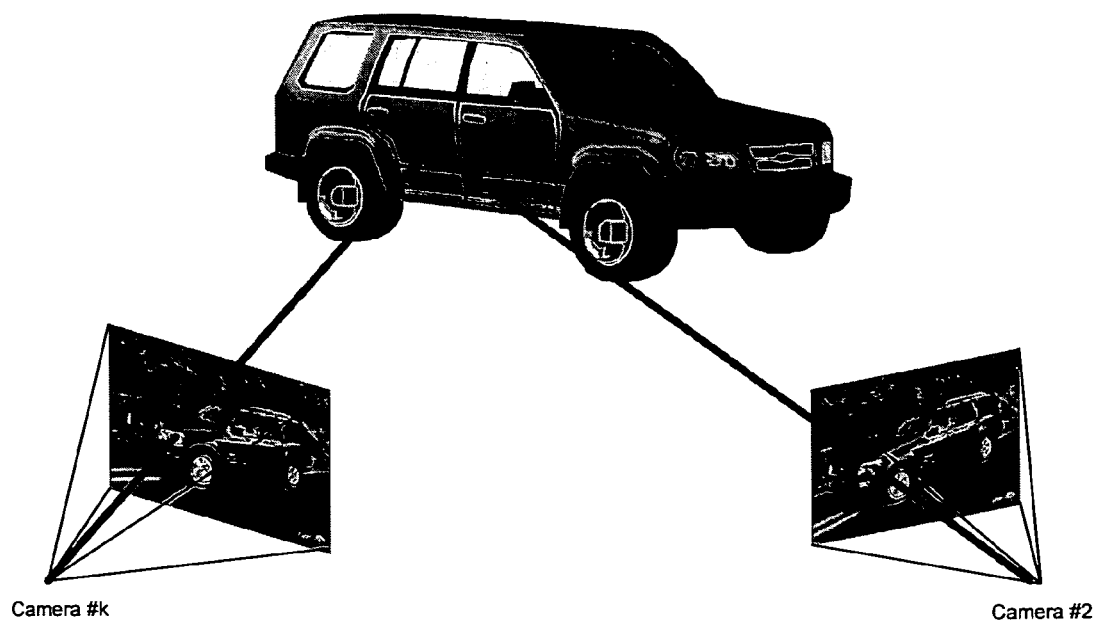
FIG. 11 is a diagram showing triangulation from two views.

Once the camera has been calibrated to determine its intrinsic parameters and the camera pose problem has been solved to determine the extrinsic parameters, the next step in the reconstruction process is to estimate the object's 3D structure. Photogrammetry uses a principle called triangulation to determine an object's three-dimensional coordinates from multiple photographs. Points are triangulated by finding the intersection of converging lines of sight, or rays as shown in FIG. 11.

Figure 12:
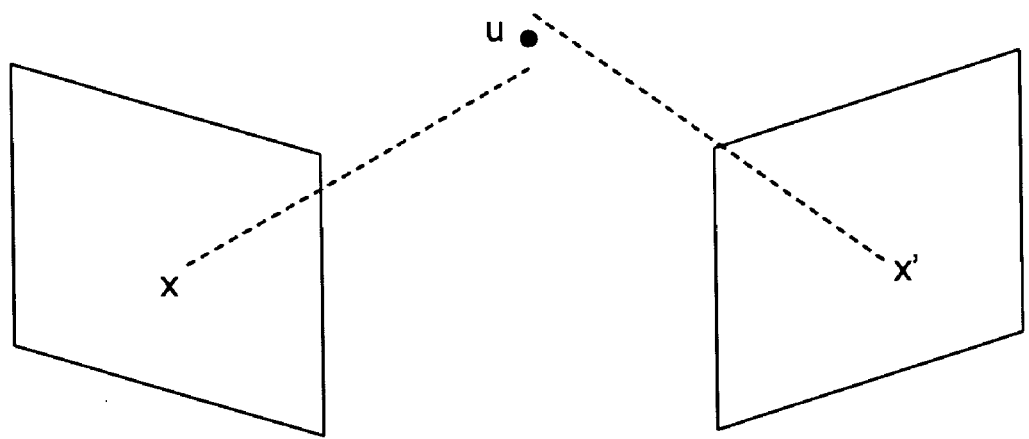
FIG. 12 is a conceptual diagram depicting rays back projected from imperfectly measured image points.

Since the camera positions and orientations are only known approximately and there are errors in the measured image points, rays will often not back-project to a common intersection shown in FIG. 12. The techniques in this section describe how to estimate the 3D structure of the object. This estimate of structure, as well as the camera poses, are later refined in a process called bundle adjustment.

In each image, the 3D point, X, is projected to a measured image point, i.e., x=PX and x'=P'X. Here, P and P' are 33 4 projection matrices given by $$P = K[R - RC]$$

where K is the 3×3 camera calibration matrix, R is the 3×3 rotation matrix from object space to camera space, and C is the position of the camera with respect to the object.

The definition of vector cross product can be used to form a linear system. By definition, a cross product of two identical vectors is a vector of all zeros. Therefore, for each point, the cross product of the measured image point and the 3D point projected to that image is zero, i.e., $$x \times (PX) = 0$$

This results in the following linear system in X for each image.

$$x(p^{3T}X) - p^{1T} 0$$

$$y(p^{3T}X) - p^{2T} = 0$$

$$x(p^{2T}X) - y(p^{1T}X) = 0$$

where $p^{iT}$ is the ith row of the projection matrix.

Using both images, a system of the form AX=0 can be composed, where $$A = \begin{bmatrix} x(p^{3T}X) - p^{1T} \\ y(p^{3T}X) - p^{2T} \\ x'(p'^{3T}X) - p'^{1T} \\ y'(p'^{3T}X) - p'^{2T} \end{bmatrix}$$

Since only two of the three equations from each image are linearly independent, only two equations from each image are included. The solution of this system is calculated via singular value decomposition (SVD). The 3D point is then given by the smallest singular value of A. Specifically, if $UDV^T$ is the singular value decomposition of A, then the solution X is the last column of V.

An alternative to the DLT method is to calculate the optimal depth. In this method, a 3D point is first calculated by back-projecting a ray through one of the measured image points for some distance, d, i.e., $$\hat{X} = C + dR^T \begin{pmatrix} \frac{(x - u_0)}{f_x} \\ \frac{(y - v_0)}{f_y} \\ 1 \end{pmatrix}$$

where the measured point is (x,y), the principal point is ($u_0$, $v_0$) and the focal lengths in the x and y direction are ($f_x$, $f_y$).

This 3D point is then projected into the other image, i.e., $$\hat{x}' = P'\hat{X}$$

The optimal depth is then the depth which minimizes the reprojection error in the other image.

Figure 13:
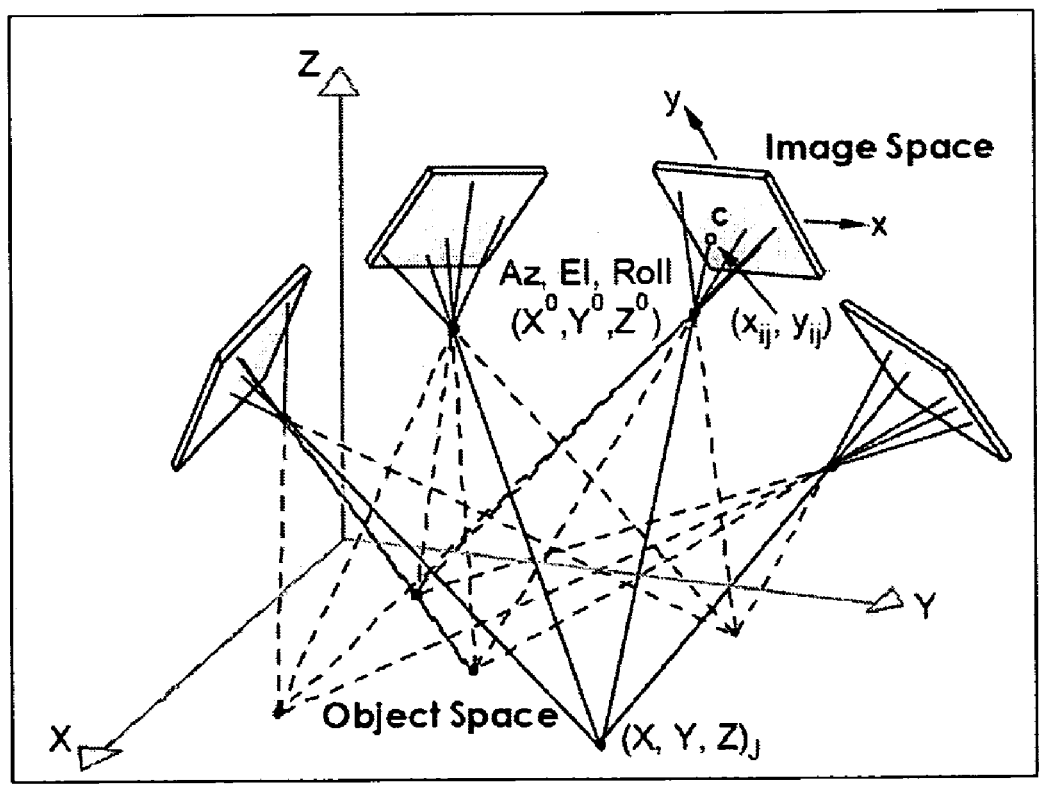
FIG. 13 is a diagram showing the concept of bundle adjustment.

The final step of the visual reconstruction is known as bundle adjustment. In this step, the visual reconstruction is refined to produce a jointly optimal structure (3D feature points of an object) and motion (camera pose). The name refers to the "bundles" of light which are reflected by the object's features into the camera lens, and are projected by the camera onto the 2D image surface. The bundles are optimally "adjusted" by varying both the 3D feature coordinates and the camera pose parameters, such that the total reprojection error between observed and predicted image points is minimized as shown in FIG. 13. Bundle adjustment is robust in that it is tolerant to missing data and it provides a true maximum likelihood estimate. Given initial estimates of the camera poses and 3D structure of the object, bundle adjustment is carried out using a sparse implementation of the Levenberg-Marquardt algorithm. Numerous problems in photogrammetry and computer vision are posed as non-linear least squares problems. Non-linear least squares problems have an objective function of the form $$F(p) = \frac{1}{2} \sum_i^M [f(p)]^2 = \frac{1}{2}\|f(p)\|^2 = \frac{1}{2}f(p)^T f(p)$$

The vector f(p) is called the residual and the vector $p = [p_1, \ldots P_N]$ is the set of control variables. Each element of the residual vector is the difference between an observation, $x_i$, and a prediction, $\hat{x}_i$. For example, in the case of bundle adjustment, the control variables are the 3D feature coordinates and camera pose parameters and the residual is the difference between observed image points and predicted image points. Non-linear least squares problems can be solved if they are overdetermined, i.e. if the number of observations, M, is greater than the number of control variables, N.

Like many other optimization problems, the necessary conditions for optimality are based on the first and second-order partial derivatives of the objective function with respect to the control variables. At a local minimizer, the gradient of the objective function should tend toward zero and the Hessian should be positive semidefinite.

The gradient of the objective function is a vector whose elements are the first-order partial derivatives with respect to the control variables, i.e., $$g = F'(p) = \begin{bmatrix} \frac{\partial F}{\partial p_1} \\ \vdots \\ \frac{\partial F}{\partial p_N} \end{bmatrix}$$

Similarly, the Hessian of the objective function is a matrix whose elements are the second-order partial derivatives with respect to the control variables, i.e., $$H = F''(p) = \begin{bmatrix} \frac{\partial^2 F}{\partial p_1^2} & \frac{\partial^2 F}{\partial p_1 \partial p_2} & \cdots & \frac{\partial^2 F}{\partial p_1 \partial p_N} \\ \frac{\partial^2 F}{\partial p_2 \partial p_1} & \frac{\partial^2 F}{\partial p_2^2} & \cdots & \frac{\partial^2 F}{\partial p_2 \partial p_N} \\ \vdots & \vdots & \ddots & \vdots \\ \frac{\partial^2 F}{\partial p_N \partial p_1} & \frac{\partial^2 F}{\partial p_N \partial p_2} & \cdots & \frac{\partial^2 F}{\partial p_N^2} \end{bmatrix}$$

The Jacobian matrix is a matrix of all first-order partial derivatives of a vector-valued function.
The Jacobian of the residual is defined as $$J_{i,j} = \frac{\partial f_i(p)}{\partial p_j}$$

Based on the form of the objective function, the gradient can be expressed in terms of the Jacobian of the residual, i.e., $$g = \frac{\partial}{\partial p_j} \left\{ \frac{1}{2} \sum_i^M [f(p)]^2 \right\} = \sum_i^M \left[ f(p) \frac{\partial f_i(p)}{\partial p_j} \right] = J^T f(p)$$

Similarly, the Hessian can be expressed in terms of the Jacobian of the residual, i.e., $$H =$$

$$F''_{i,j} = \frac{\partial}{\partial p_j \partial p_k} \sum_i^M \left[ f(p) \frac{\partial f_i(p)}{\partial p_j} \right] = \sum_i^M \left[ f(p) \frac{\partial^2 f_i(p)}{\partial p_j \partial p_k} + \frac{\partial f_i(p)}{\partial p_j} \frac{\partial f_i(p)}{\partial p_k} \right]$$

$$H = J^T J + \sum_i^M [f(p) f''(p)]$$

When the residual is small, the higher order terms are negligible. Neglecting the higher order terms results in the Gauss-Newton approximation of the Hessian, i.e., $$H = J^T J$$

Figure 14:
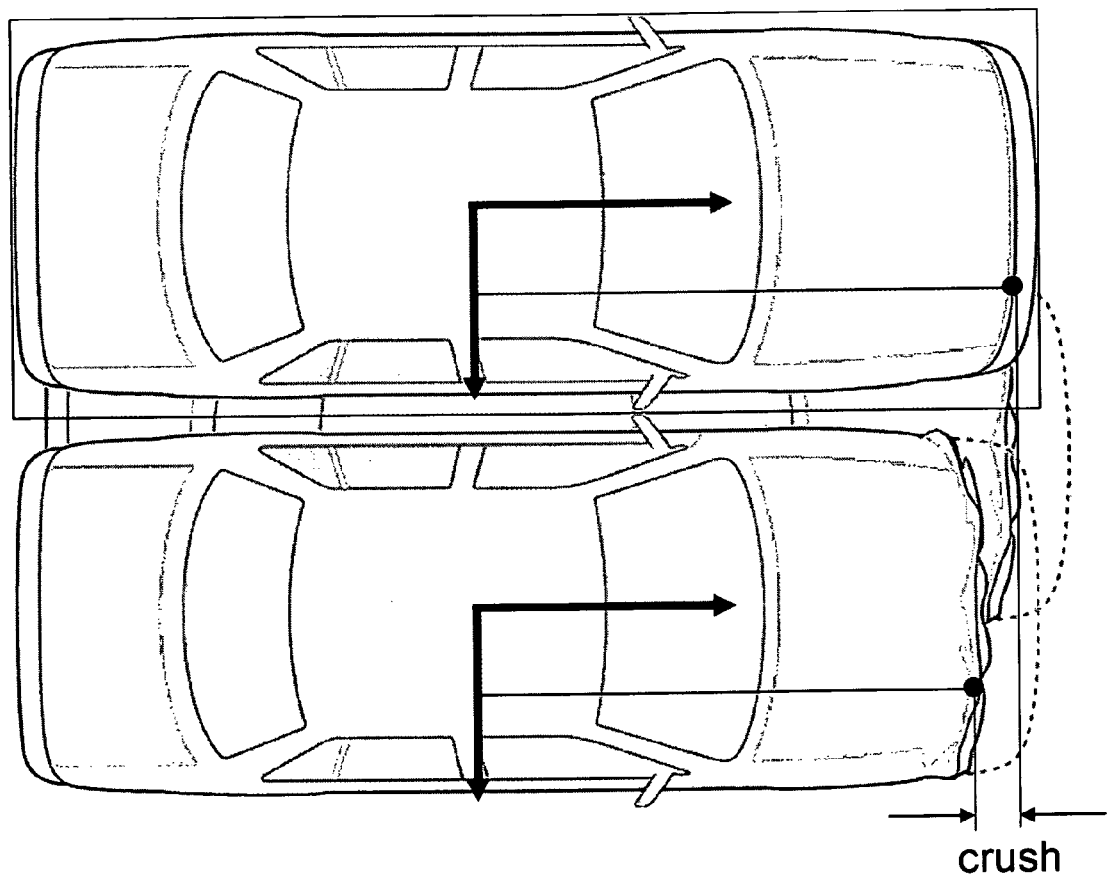
FIG. 14 is a diagram showing the concept of comparing a damaged vehicle with an exemplar vehicle.
Figure 15:
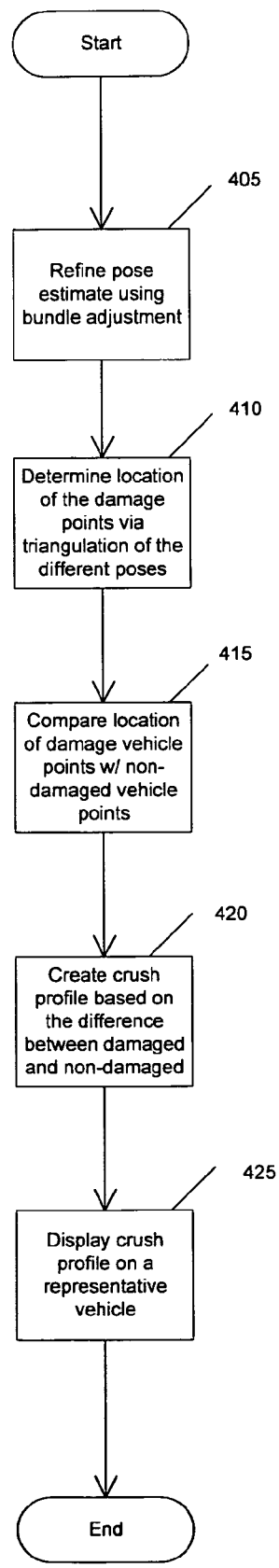
FIG. 15 is a flow diagram of a method of creating a crush damage profile using photogrammetry techniques in accordance with one embodiment of the present invention.

After completing the bundle adjustment, the reconstructed 3D points of the subject vehicle are compared with the geometry of an undamaged vehicle. For vehicles with front and rear damage, the difference between these points in the fore and aft direction yields the residual crush shown in FIG. 14. Likewise, for vehicles with side damage, the difference in the lateral direction yields the residual crush. Referring now to FIG. 15, shown is a flow diagram of the determination of a vehicle damage profile from a comparison of the damage measurements with an undamaged vehicle's measurements in accordance with one embodiment of the present invention. After the pose is estimated as described in method 300, control is passed to method 400 to refine pose and determine the crush points via triangulation. Method 400 may be performed in a computer system, e.g., a central system in which image data regarding a vehicle is received and processed. The initial pose estimate is refined using a bundle adjustment, as described above (block 405). Control is passed to block 410 to determine the location of the damage points using triangulation of the points on the different photos. Control is passed to block 415 to compare the damage point locations to the same points on a non-damaged vehicle. This non-damaged vehicle may be a reference or benchmark vehicle that is the same as the vehicle involved in the accident, or may be a substantially similar vehicle, such as having a common body type. Control is passed to block 420 to create a crush damage profile based on the comparison of the damaged versus the non-damaged vehicle. Control is passed to block 425 to display a crush profile on a representative vehicle, e.g., on a display of the computer system. Furthermore, the crush profile may be stored in the system for later use. For example, using the crush profile information various measures of accident severity, including potential for injury, likely damage to the vehicle and so forth may be determined. Furthermore, by obtaining the crush profile information using photographs of the vehicle via a photogrammetric analysis, embodiments may be efficiently used and may streamline an evaluation process, as photographs may be more easily obtained than further detailed information regarding damage to a vehicle. This information also may be used, e.g., to audit claim estimates to determine whether the claim repair estimate is appropriate in light of the crush profile and other information obtained via a photogramrnmetric analysis.

Once the crush damage profile has been determined, several data points of interest can be developed. One piece of information is to estimate the impact severity of the collision by calculating the change in velocity of the vehicle from the energy required to deform the vehicle. In one embodiment, the impact severity may be estimated in accordance with the methods described in U.S. Pat. No. 6,885,981 (herein the '981 patent'), which is commonly assigned with the present application, the contents of which are hereby incorporated by reference. Another piece of information is the Principal Direction of Force or PDOF of the collision.

Figure 16:
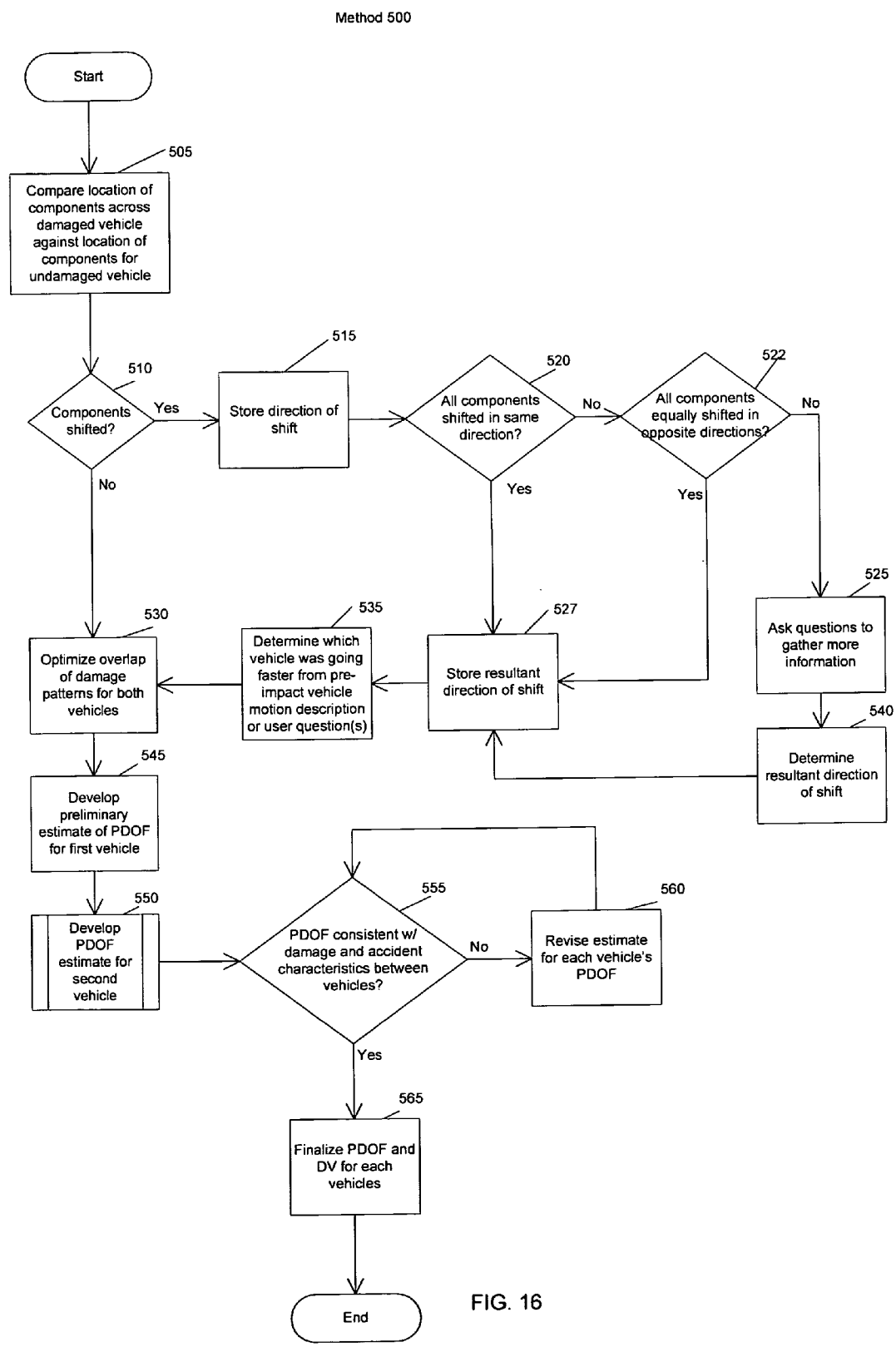
FIG. 16 is a flow diagram of a method of determining PDOF from a crush damage profile generated via photogrammetry in accordance with one embodiment of the present invention.

FIG. 16 shows a flow diagram of the determination of PDOF from a crush profile generated by photogrammetry analysis in accordance with one embodiment of the current invention. As shown in FIG. 16, method 500, which may be performed in the same system used to receive photographic information and process the same to obtain crush data, begins at block 505, where individual components of the vehicle (e.g., hood, fenders, etc.) are evaluated for the direction in which they were moved in the accident by comparing the damaged location of the component versus the non-damaged location of the component, as present on a reference vehicle. As an example, the driver's side headlight and hood may have been shifted toward the passenger's side as a result of the impact. This result would be stored as a shift to the left. Control is passed to decision diamond 510 to determine if there were any components shifted. If components were shifted, control is passed to block 515 and the direction of each component's shift is stored. Control is passed to decision diamond 520 to evaluate if all components that are damaged are shifted in the same direction. If all components are shifted in the same direction as evaluated by decision diamond 520, control is subsequently passed to block 527 to store the resultant direction of shift. Control is subsequently passed to block 535 to evaluate input about the accident and vehicle motion before the accident, such as to determine which vehicle had a greater velocity at impact. Such input may correspond to user-supplied input regarding information associated with the accident, such as obtained by police reports, accident reports, event data recorder (EDR) data or other such means.

If decision diamond 520 results in components shifted in different directions, control is passed to evaluate the component shift (decision diamond 522). If the components are equally dispersed (e.g., a component point on the right side is shifted 2 inches to the right and the corresponding component point is shifted 2.5 inches to the left), then the PDOF would be estimated without additional input and control is passed to block 527 to store the resultant direction of shift and then to block 535 as discussed above. If the components are not equally dispersed (e.g., a component point on the right side is shifted 2 inches to the right and the corresponding component point is shifted 5 inches to the left), control may be passed to block 525 to gather more information about the component shift via requesting input from a user. Such information may include, for example, the nature of the impact (e.g., the impact was to a pole) or the nature of the component shift (e.g., are the components on the front of the vehicle shifted more to (a) the driver's side, (b) the passenger's side, or (c) neither side). Control is passed to block 540 to finalize estimate of the resultant component shift by collecting the results of the component analysis and determining the overall component shift pattern (e.g., driver's side shift, passenger side shift, or neutral shift) and control is subsequently passed to block 527 to store the resultant direction of shift. Control is subsequently passed to block 535, discussed above. Control then passes to block 530.

If no components were shifted, control is also passed to block 530. At block 530, the overlap of the damage patterns on the two vehicles may be optimized by comparing and aligning the damage profiles on each of the vehicles. Control is passed to block 545 to develop a preliminary estimate of PDOF for the first vehicle. In one embodiment, such a determination may be performed by examining the damage pattern, the overall component shift pattern and the input about vehicle motion before impact and determining the direction of the impact that is consistent with these data (e.g., a vehicle with significant component shift toward the passenger's side and crush to the head light and fender on the driver's side, and was moving slower than the other vehicle might be consistent with a 10 to 11 o'clock PDOF).

Control then passes to block 550 to develop a PDOF for the second vehicle which may be performed as previously described for the first vehicle. Control is passed to decision diamond 555 to evaluate consistency of the PDOF between the two vehicles. This consistency may be measured, e.g., based on damage information regarding the vehicles, accident characteristics and so forth. If PDOF is consistent between the vehicles, control is passed to block 565 to assign a final PDOF estimate for each vehicle, as well as generate a change in velocity (DV) for each vehicle by using the initial estimates for crush damage and PDOF to estimate the impact severity, e.g., in accordance with the methods described in the '981 patent. Otherwise, if the PDOF is not consistent as evaluated in decision diamond 555, the PDOF estimates are revised (as shown in block 560) by adjusting the PDOF estimate and/or the vehicle damage overlap optimization within reasonable parameters in an iterative process. Control is passed back to decision diamond 555 for reevaluation. When consistent PDOFs are determined, control passes to block 565, where PDOFs and change in velocity values may be finalized for the vehicles by using the initial estimates for crush damage and PDOF to estimate the impact severity, such as in accordance with the methods described in the '981 patent. These finalized estimates of both PDOF and change in velocity may be stored in the system for later use. Furthermore, this information may be reported to a user, e.g., via display or transmission to a remote location. Based on this estimated information, a user may use the information in considering whether claim information, such as property damage, personal injury and so forth is consistent with the PDOF and change in velocity. This estimated information can possibly be used in determination of liability for the accident as well by determining the point and angle of impact, pre-impact vehicle speeds, etc.

Figure 17:
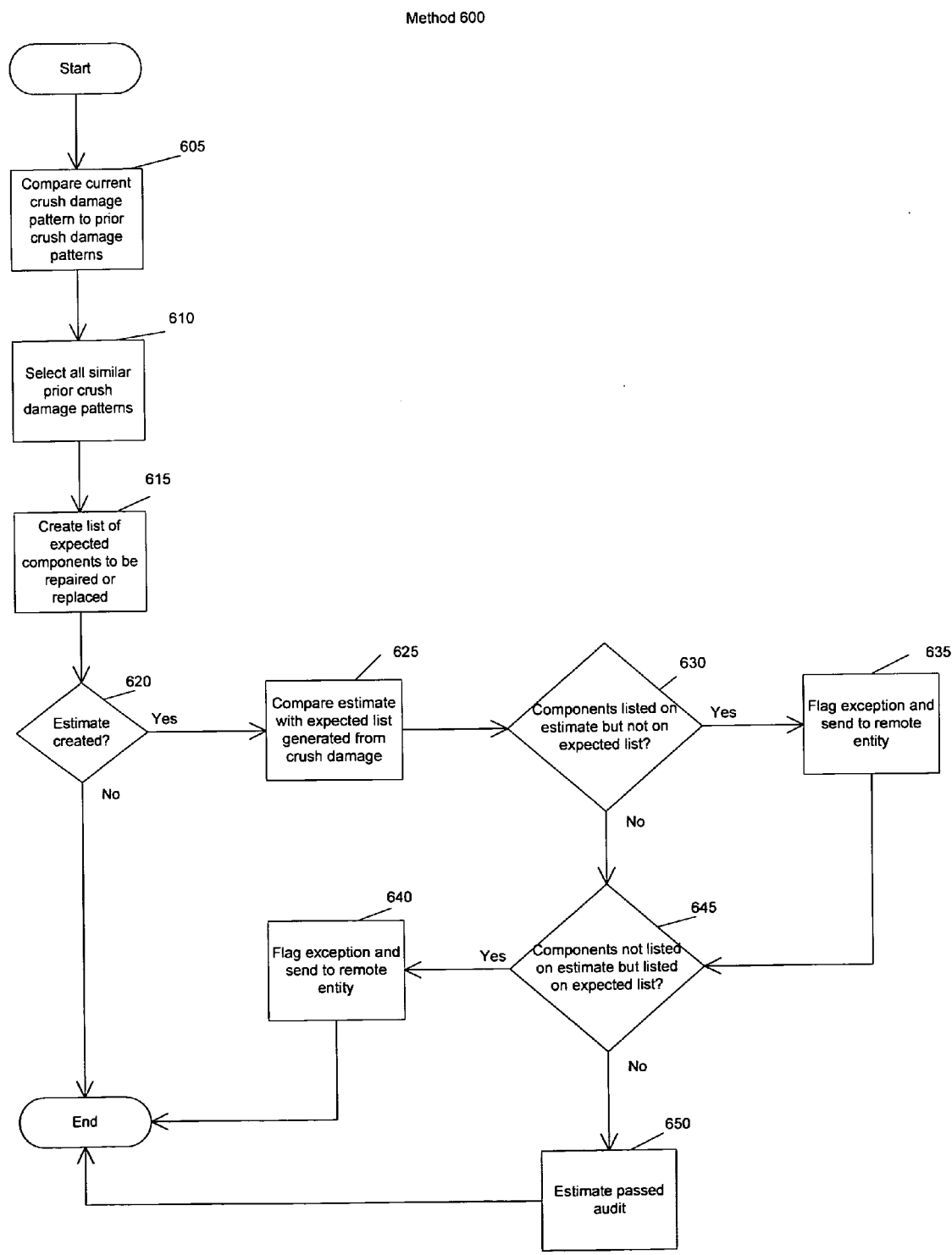
FIG. 17 is a flow diagram of a method of estimating component damage for repairing a vehicle from a crush damage profile generated via photogrammetry in accordance with one embodiment of the present invention.

Referring now to FIG. 17, shown is a flow diagram of a method of estimating damaged components from a crush profile in accordance with one embodiment of the current invention. Method 600 may begin at block 605, where a comparison occurs between collisions of similar severity (i.e., change in velocity or DV) and direction (i.e., principal direction of force or PDOF) for the same or similar vehicles in a database and the vehicle under analysis. In some implementations, the database may be arranged in groups of files that group such similar vehicles, severity and direction. As one example, the database may be of a central system, such as an accident analysis firm that receives data regarding accidents from multiple client sources, such as insurance companies and others, and compiles the database continually as additional accident data is received, such that that database may be of a dynamic nature which may aid in obtaining accurate estimate information. Accordingly, method 600 may be used in some embodiments to act as an audit source for a claim associated with a vehicle accident to determine whether a claim level asserted is appropriate, e.g., if it falls within a range for similar accidents involving similar vehicles. Control is passed to block 610 to select and return all similar impacts, the components and operations (i.e., repair or replace) for the components for the similar collisions involving the same or a similar vehicle(s). Control is passed to block 615 to create a list of expected components and component operations for the current accident. This list may be created by identifying repair/replace components for the similarly damaged vehicles of the database. In one embodiment, the list may be created by combining or analyzing the repair/replace components of these other vehicles in accordance with a statistical analysis, a mathematical analysis or another such means. While not shown in FIG. 17, this list may be used to determine a list of repair/replace components for the vehicle, and in some embodiments, an expected cost for such repair/replacement.

Control is passed to decision diamond 620 to determine whether an independent estimate has been created. If an independent assessment of the components that need to be repaired or replaced has been developed, e.g., via a claims adjuster, control is passed to block 625 so this new assessment can be compared with the components that are predicted to need repair or replacement. Control is passed to decision diamond 630 to identify components on the estimate that are not on the expected list. If there are components that are not on the expected list, control is passed to block 635 to flag an exception with respect to the comparison. For example, any outliers may be indicated for further review and an adjuster or other remote entity may be notified, e.g., electronically (e.g., email or to the insurance company computer system) or similar communication. Control is then passed to decision diamond 645. If no components on the independent estimate are different than the expected list as determined at diamond 630, control is also passed to decision diamond 645 to determine if there are components on the expected list but not on the independent estimate. If there are components on the expected list that are not on the independent estimate, control is passed to block 640 with any outliers indicated for further review. If no components on the expected list are missing on the independent estimate, then control is passed to block 650 and the estimate is determined to have passed the audit. The audit may also be considered to pass so long as the report and the estimate are within a threshold amount (e.g., by number of components, matching score or other measures) of each other.

Note also that the audit results can be stored along with an entry in the database to include information regarding the vehicle and accident, to further aid in analyzing of future accidents. While shown with this particular implementation in the embodiment of FIG. 17, it is to be understood that the scope of the present invention is not limited in this regard. For example, in other implementations in addition to or instead of analyzing crush pattern information, accident information from such similarly situated accidents may be compared to injury information, e.g., from a claim for the present accident to determine whether the contended injury level is in substantial relation with injuries occurring in these similarly situated accidents.

Figure 18:
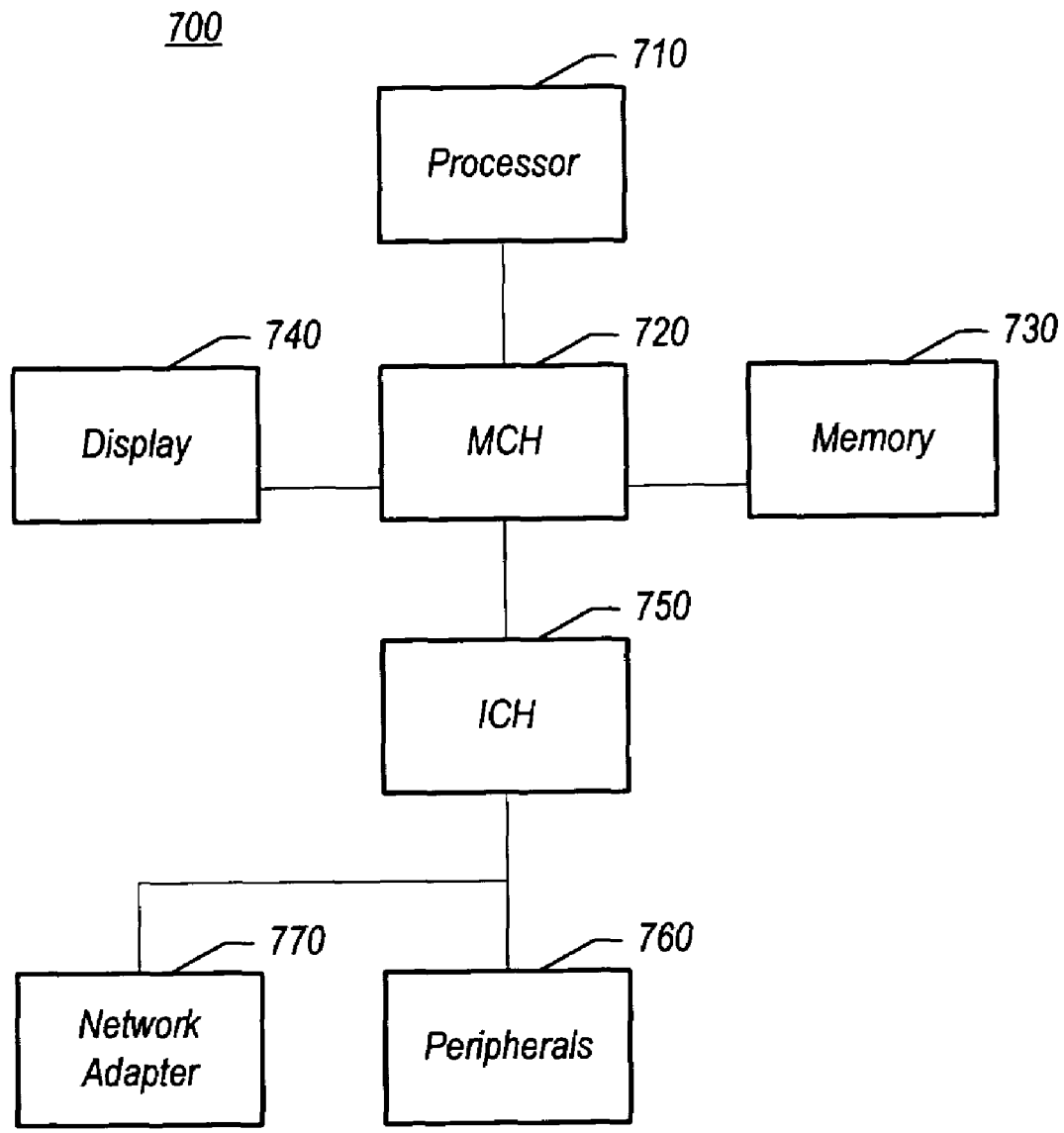
FIG. 18 is a block diagram of a system in accordance with one embodiment of the present invention.

Referring now to FIG. 18, shown is a block diagram of a system in accordance with one embodiment of the present invention. As shown in FIG. 18, system 700 may be a computer system, such as a personal computer, server computer or other such system. System 700 may include a processor 710, which may be a microprocessor such as a central processing unit. Processor 710 is coupled via a memory controller hub (MCH) 720 that in turn is coupled to a memory 730 and a display 740, which may be a flat panel display, for example. During operation, memory 730 may store software in accordance with an embodiment of the present invention that includes instructions to perform the various techniques described herein.

As further shown in FIG. 18, MCH 720 is coupled to an input/output controller hub (ICH) 750. In turn, ICH 750 may be coupled to various peripherals 760 and a network adapter 770. Network adapter 770 may be used to communicate between system 700 and one or more other computers via a computer network, such as a local area network (LAN), a wide area network (WAN), or a wireless network, such as a wireless LAN (WLAN). Furthermore, network adapter 770 may communicate with remote systems, such as computers of an insurance company or other third party that desires to send vehicle and accident information (e.g., including photographic information) to system 700 for analysis in accordance with an embodiment of the present invention. Such communication may be via the Internet or another such computer network. In some implementations, these communications may be made secure, e.g., via encryption or in another secure format.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer-implemented method comprising:

receiving a plurality of images of a vehicle involved in an accident and undergoing a computer-implemented impact severity analysis in a computer;

evaluating, in the computer, the plurality of images for pose estimate information and storing a pose estimate for each of the plurality of images;

refining the stored pose estimate for each of the plurality of images via a bundle adjustment;

determining, in the computer, the location of damage points for the vehicle via triangulation using the plurality of images;

generating, in the computer, a crush profile for the vehicle based on a difference between the location of damage points for the vehicle and corresponding points for a benchmark vehicle, the benchmark vehicle non-damaged;

using the crush profile and a crush profile for a second vehicle involved in the accident, in the computer, to optimize an overlap of damage patterns on the first and second vehicles by comparison and alignment of the damage patterns on the first and second vehicles;

determining, in the computer, estimates of a principal direction of force (PDOF) for the vehicle and the second vehicle based on the optimized overlap; and determining a final PDOF for the vehicle and the second vehicle based on an iterative adjustment of the PDOF estimates if the PDOF estimates are inconsistent, and storing the final PDOFs in the computer for later use.

2. The method of claim 1, further comprising displaying the crush profile in a graphical user interface including a reference vehicle.

3. The method of claim 1, further comprising receiving an input to select a reference pose to correspond to at least one of the plurality of images.

4. The method of claim 3, further comprising selecting control points and crush points for at least one of the plurality of images.

5. The method of claim 1, further comprising accessing the crush profile and selecting a plurality of stored crush profiles having corresponding crush profiles within a predetermined threshold of the crush profile.

6. The method of claim 5, further comprising auditing a claim associated with the accident based on a comparison between the crush profile and the plurality of stored crush profiles.

7. The method of claim 1, further comprising determining, in the computer, if a camera profile received with the plurality of images corresponds to a camera profile present in a profile database accessed by the computer.

8. The method of claim 7, further comprising calibrating the plurality of images based on the camera profile if present, otherwise requesting additional information from a user of the camera.

9. An article comprising a machine-accessible storage medium including instructions that when executed cause a system to:

receive a plurality of images of a vehicle involved in an accident and undergoing a computer-implemented impact severity analysis in the system;

evaluate the plurality of images for pose estimate information and store a pose estimate for each of the plurality of images;

refine the stored pose estimate for each of the plurality of images via a bundle adjustment;

determine the location of damage points for the vehicle via triangulation using the plurality of images;

generate a crush profile for the vehicle based on a difference between the location of damage points for the vehicle and corresponding points for a reference vehicle, the reference vehicle non-damaged and substantially similar to the vehicle;

use the crush profile and a crush profile for a second vehicle involved in the accident to optimize an overlap of damage patterns on the first and second vehicles by comparison and alignment of the damage patterns on the first and second vehicles;

determine estimates of a principal direction of force (PDOF) for the vehicle and the second vehicle based on the optimized overlap; and determine a final PDOF for the vehicle and the second vehicle based on an iterative adjustment of the PDOF estimates if the PDOF estimates are inconsistent, and store the final PDOFs in the system for later use.

10. The article of claim 9, wherein the instructions further enable the system to display the crush profile in a graphical user interface including the reference vehicle.

* * * * *